(12) United States Patent
Avadhani et al.

(10) Patent No.: US 12,117,819 B2
(45) Date of Patent: Oct. 15, 2024

(54) MODIFYING OPERATION OF PHYSICAL EMISSION SOURCES USING A MODIFIED GRADIENT DESCENT MODEL

(71) Applicant: OneTrust LLC, Atlanta, GA (US)

(72) Inventors: Madan Avadhani, Palo Alto, CA (US); Akhil Dandamudi, Atlanta, GA (US); Sohail Jooma, Atlanta, GA (US); Phil Redman, Atlanta, GA (US); Casey Hill, Atlanta, GA (US); Daniel B Quintas, Smyrna, GA (US)

(73) Assignee: OneTrust LLC, Atlanta, GA (US)

( * ) Notice: Subject to any disclaimer, the term of this patent is extended or adjusted under 35 U.S.C. 154(b) by 0 days.

(21) Appl. No.: 18/326,474

(22) Filed: May 31, 2023

(65) Prior Publication Data

US 2023/0305547 A1    Sep. 28, 2023

Related U.S. Application Data

(63) Continuation of application No. 17/592,878, filed on Feb. 4, 2022, now Pat. No. 11,703,844.
(Continued)

(51) Int. Cl.
*G05B 15/02* (2006.01)
*G05B 23/02* (2006.01)
(Continued)

(52) U.S. Cl.
CPC ......... *G05B 23/0216* (2013.01); *G05B 15/02* (2013.01); *G05B 23/0213* (2013.01);
(Continued)

(58) Field of Classification Search
None
See application file for complete search history.

(56) References Cited

U.S. PATENT DOCUMENTS

2006/0271210 A1    11/2006    Subbu et al.
2009/0030753 A1    1/2009    Senturk-Doganaksoy et al.
(Continued)

FOREIGN PATENT DOCUMENTS

CN    112200350 A    1/2021
JP    2004-190620 A    7/2004

OTHER PUBLICATIONS

U.S. Appl. No. 17/650,724, filed Aug. 11, 2023, Office Action.
(Continued)

*Primary Examiner* — Bernard G Lindsay
(74) *Attorney, Agent, or Firm* — Keller Preece PLLC

(57) ABSTRACT

Methods, systems, and non-transitory computer readable storage media are disclosed for generating action recommendations modifying physical emissions sources of an entity based on past and modeled emissions for the entity. Specifically, the disclosed system monitors emissions produced by an entity by determining a number of emissions sources corresponding to an entity and a plurality of emissions values for the emissions sources. Additionally, the disclosed system determines a plurality of constraints corresponding to the entity. The disclosed system also determines goals for the entity including target emissions values. The disclosed system utilizes a modified gradient descent model to iteratively adjust emissions values for the physical emissions sources to obtain the target emissions values according to the constraints. The disclosed system generates action recommendations for modifying the physical emissions sources utilizing the modified gradient descent model and provides the action recommendations for display within a graphical user interface.

20 Claims, 16 Drawing Sheets

Related U.S. Application Data

(60) Provisional application No. 63/262,200, filed on Oct. 7, 2021.

(51) Int. Cl.

| | |
|---|---|
| *G06F 3/04847* | (2022.01) |
| *G06F 40/40* | (2020.01) |
| *G06N 3/04* | (2023.01) |
| *G06N 3/045* | (2023.01) |
| *G06N 7/01* | (2023.01) |
| *G06Q 10/04* | (2023.01) |
| *G06Q 50/06* | (2012.01) |

(52) U.S. Cl.
CPC ......... *G06F 3/04847* (2013.01); *G06F 40/40* (2020.01); *G06N 3/04* (2013.01); *G06N 3/045* (2023.01); *G06N 7/01* (2023.01); *G06Q 10/04* (2013.01); *G06Q 50/06* (2013.01)

(56) References Cited

U.S. PATENT DOCUMENTS

| | | | |
|---|---|---|---|
| 2011/0273737 A1 | 11/2011 | Hirao | |
| 2014/0316973 A1* | 10/2014 | Steven | H02J 3/008 705/37 |
| 2018/0081999 A1 | 3/2018 | Chappell | |
| 2018/0082000 A1 | 3/2018 | Chappel | |
| 2019/0372345 A1 | 12/2019 | Bain et al. | |
| 2020/0372588 A1 | 11/2020 | Shi | |
| 2021/0065859 A1 | 3/2021 | McKinney et al. | |
| 2021/0073636 A1 | 3/2021 | Federspiel et al. | |
| 2021/0216932 A1 | 7/2021 | Koguma et al. | |
| 2021/0285017 A1* | 9/2021 | Feldmann | C10B 53/02 |
| 2022/0188652 A1* | 6/2022 | Pabrinkis | G06F 18/22 |
| 2022/0373638 A1* | 11/2022 | Chrabieh | H04L 5/0051 |
| 2023/0020417 A1 | 1/2023 | Elbsat et al. | |
| 2023/0065744 A1* | 3/2023 | Cousins | G06Q 10/06 |

OTHER PUBLICATIONS

Bains et al. CO2 capture from the industry sector Progress in Energy and Combustion Science 63 (2017) 146-172.

International Search Report & Written Opinion as received in PCT/US2022/015255 dated Apr. 4, 2022.

International Search Report & Written Opinion as received in PCT/US2022/070629 dated Apr. 4, 2022.

International Search Report & Written Opinion as received in PCT/US2022/070685 dated May 9, 2022.

Kung, Li et al., "A recommender system for the optimal combination of energy resources with cost-benefit analysis." 2015 International Conference on Industrial Engineering and Operations Management (IEOM). IEEE (Year: 2015).

Lin et al. "Planning of energy system management and GHG-emission control in the Municipality of Beijing—An inexact-dynamic stochastic programming model." Energy Policy 37.11 (Year: 2009).

U.S. Appl. No. 17/592,878, filed May 16, 2022, Office Action.

U.S. Appl. No. 17/592,878, filed Aug. 23, 2022, Office Action.

U.S. Appl. No. 17/592,878, filed Jan. 25, 2023, Notice of Allowance.

U.S. Appl. No. 17/592,878, filed Mar. 9, 2023, Notice of Allowance.

U.S. Appl. No. 17/650,724, filed May 19, 2022, Office Action.

U.S. Appl. No. 17/650,724, filed Sep. 21, 2022, Office Action.

U.S. Appl. No. 17/650,724, filed May 9, 2023, Office Action.

U.S. Appl. No. 17/651,388, filed Jul. 18, 2022, Office Action.

U.S. Appl. No. 17/651,388, filed Nov. 23, 2022, Office Action.

U.S. Appl. No. 17/651,388, filed Mar. 28, 2023, Notice of Allowance.

Geng et al., "Electricity production scheduling under uncertainty: Max social welfare vs. min emissions vs. max renewable production." Applied Energy 193: 540-549 (2017).

U.S. Appl. No. 17/650,724, filed Feb. 20, 2024, Office Action.

U.S. Appl. No. 18/326,499, filed Dec. 15, 2023, Office Action.

International Preliminary Report on Patentability as received in PCT/US2022/015255 dated Apr. 18, 2024.

International Preliminary Report on Patentability as received in PCT/US2022/070629 dated Apr. 18, 2024.

International Preliminary Report on Patentability as received in PCT/US2022/070685 dated Apr. 18, 2024.

U.S. Appl. No. 18/326,499 filed Apr. 3, 2024, Office Action.

* cited by examiner

| Category | Entity Usage | Emission Source | Unit Cost | Unit Size | Unit | 2020 Units |
|---|---|---|---|---|---|---|
| Fuel Type | Restaurant Heater | Blast Furnace Gas | 10 | 1 | mmBTU | 15 |
| Fuel Type | Pizza Oven | Blast Furnace Gas | 20 | 1 | mmBTU | 10 |
| Fuel Type | Kitchen | Natural Gas | 20 | 1 | mmBTU | 15 |
| Fuel Type | Office Building | Mixed (Commercial Sector) | 30 | 1 | mmBTU | 5 |
| S1- Mobile Combustion | Business Travel | Aviation Gasoline - Aviation Gasoline Aircraft | 60 | 1 | gal (US) | 14 |
| S1- Mobile Combustion | Delivery 1 | Electricity- Mobile - Electric Vehicle | 23 | 1 | gal (US) | 12 |
| S1- Mobile Combustion | Delivery 2 | Diesel Fuel - Light duty trucks | 14 | 1 | gal (US) | 12 |
| S1- Mobile Combustion | Delivery 3 | CNG- Light-duty vehicles | 34 | 1 | gal (US) | 34 |
| S3- Transport | Employee Travel 1 | Passenger Car A | 12 | 1 | vehicle-mile | 3 |
| S3- Transport | Employee Travel 2 | Light-Duty Truck B | 8 | 1 | vehicle-mile | 4 |
| | | TOTAL | 231 | | | |

*Fig. 8A*

| | Emissions | | | | | |
|---|---|---|---|---|---|---|
| | CO2 factor | CH4 factor | N2O factor | BIO CO2 factor | AR4 (CO2e) factor | AR5 (CO2e) factor |
| | 274.32 | 0.02 | 0.10 | 0.00 | 274.35 | 274.35 |
| | 274.32 | 0.02 | 0.10 | 0.00 | 274.35 | 274.35 |
| | 53.06 | 1.00 | 0.10 | 0.00 | 53.11 | 53.11 |
| | 94.27 | 11.00 | 1.60 | 0.00 | 95.02 | 95.00 |
| | 69.25 | 3.00 | 0.60 | 0.00 | 69.50 | 69.49 |
| | 0.00 | 0.00 | 0.00 | 0.00 | 0.00 | 0.00 |
| | 10.21 | 0.00 | 0.00 | 0.00 | 10.22 | 10.22 |
| | 0.41 | 0.09 | 0.01 | 0.00 | 4.45 | 4.51 |
| | 0.34 | 0.02 | 0.01 | 0.00 | 0.35 | 0.35 |
| | 0.47 | 0.02 | 0.02 | 0.00 | 0.48 | 0.48 |
| | 776.65 | 15.17 | 2.54 | 0.00 | 781.83 | 781.86 |

*Fig. 8B*

| User Constraints | | Optimizer Output |
| --- | --- | --- |
| Source Max Value | Source Min Value | Results |
| 18 | 9 | 14 |
| 15 | 10 | 9 |
| 22 | 15 | 15 |
| 8 | 5 | 5 |
| 21 | 14 | 14 |
| 18 | 12 | 12 |
| 18 | 12 | 12 |
| 44 | 34 | 39 |
| 5 | 3 | 3 |
| 7 | 4 | 4 |

| 2020 Costs | | Results Costs | | 2020 Emissions | | Results Emissions | |
|---|---|---|---|---|---|---|---|
| 2020 Costs | 2020 % Costs | Results Costs | Results % Costs | 2020 Total Emissions | 2020 Emission % | Results Total Emissions | Results Emission % |
| 150 | 5% | 140 | 4% | 12347.09 | 44% | 11523.95 | 43% |
| 200 | 6% | 180 | 5% | 8231.39 | 29% | 7408.26 | 28% |
| 300 | 9% | 300 | 9% | 2405.84 | 9% | 2405.84 | 9% |
| 150 | 5% | 150 | 4% | 1484.47 | 5% | 1484.47 | 6% |
| 840 | 25% | 840 | 24% | 2965.86 | 11% | 2965.86 | 11% |
| 276 | 8% | 276 | 8% | 0.00 | 0% | 0.00 | 0% |
| 168 | 5% | 168 | 5% | 367.73 | 1% | 367.73 | 1% |
| 1156 | 35% | 1326 | 38% | 321.71 | 1% | 369.02 | 1% |
| 36 | 1% | 36 | 1% | 3.20 | 0% | 3.20 | 0% |
| 32 | 1% | 32 | 1% | 5.85 | 0% | 5.85 | 0% |
| 3308 | 100% | 3448 | 100% | 28133.14 | 100% | 26534.17 | 100% |

Total

| | 2020 Emisssions | | | | | Total 2020 Emissions |
|---|---|---|---|---|---|---|
| CO2 factor | CH4 factor | N2O factor | BIO CO2 factor | AR4 (CO2e) factor | AR5 (CO2e) factor | Total |
| 4114.80 | 0.33 | 1.50 | 0.00 | 4115.26 | 4115.21 | 12347.09 |
| 2743.20 | 0.22 | 1.00 | 0.00 | 2743.50 | 2743.47 | 8231.39 |
| 795.90 | 15.00 | 1.50 | 0.00 | 796.72 | 796.72 | 2405.84 |
| 471.35 | 55.00 | 8.00 | 0.00 | 475.11 | 475.01 | 1484.47 |
| 969.50 | 42.00 | 8.40 | 0.00 | 973.05 | 972.90 | 2965.86 |
| 0.00 | 0.00 | 0.00 | 0.00 | 0.00 | 0.00 | 0.00 |
| 122.52 | 3.04 | 0.21 | 0.00 | 122.61 | 122.60 | 367.73 |
| 13.85 | 0.06 | 0.03 | 0.00 | 151.15 | 153.47 | 321.71 |
| 1.03 | 0.06 | 0.03 | 0.00 | 1.04 | 1.04 | 3.20 |
| 1.89 | 0.08 | 0.07 | 0.00 | 1.91 | 1.91 | 5.85 |
| 9234.03 | 115.72 | 20.71 | 0.00 | 9380.35 | 9382.32 | 28133.14 |

Total

| | Results Emissions | | | | Total Results Emissions |
|---|---|---|---|---|---|
| CO2 factor | CH4 factor | N2O factor | BIO CO2 factor | AR4 (CO2e) factor | AR5 (CO2e) factor | Total |
| 3840.48 | 0.31 | 1.40 | 0.00 | 3840.90 | 3840.86 | 11523.95 |
| 2468.88 | 0.20 | 0.90 | 0.00 | 2469.15 | 2469.12 | 7408.26 |
| 795.90 | 15.00 | 1.50 | 0.00 | 796.72 | 796.72 | 2405.84 |
| 471.35 | 55.00 | 8.00 | 0.00 | 475.11 | 475.01 | 1484.47 |
| 969.50 | 42.00 | 8.40 | 0.00 | 973.05 | 972.90 | 2965.86 |
| 0.00 | 0.00 | 0.00 | 0.00 | 0.00 | 0.00 | 0.00 |
| 122.52 | 0.00 | 0.24 | 0.00 | 122.61 | 122.60 | 367.73 |
| 15.88 | 3.48 | 0.03 | 0.00 | 173.38 | 176.03 | 369.02 |
| 1.03 | 0.06 | 0.03 | 0.00 | 1.04 | 1.04 | 3.20 |
| 1.89 | 0.08 | 0.07 | 0.00 | 1.91 | 1.91 | 5.85 |
| 8687.43 | 116.12 | 20.54 | 0.00 | 8853.88 | 8856.20 | 26534.17 |
| Total | | | | | | |

MODIFYING OPERATION OF PHYSICAL EMISSION SOURCES USING A MODIFIED GRADIENT DESCENT MODEL

CROSS-REFERENCE TO RELATED APPLICATIONS

This application is a continuation of U.S. patent application Ser. No. 17/592,878, filed on Feb. 4, 2022, which claims the benefit of and priority to U.S. Provisional Patent Application No. 63/262,200, filed Oct. 7, 2021. Each of the aforementioned applications is hereby incorporated by reference in its entirety.

BACKGROUND

Increases in prevalence of technological and manufacturing processes over recent decades—in addition to increasing population numbers—have led to increasing levels of greenhouse gas emissions, leading to a rapidly changing climate. As a result, many countries and organizations are increasing emissions measuring and reporting regulations for various entities based on internal and external operations of the entities. Because many entities (even small businesses) generate substantial amounts of emissions of various types from potentially hundreds of different sources, determining overall emissions from previous time periods can be a very complex and difficult problem. Furthermore, determining future emissions based on growth or other changes to entity operations given the number of emission types and sources given various constraints is also challenging. Given the emergent nature of emissions standards and reporting, conventional systems are unable to monitor emissions from large numbers of sources while also modeling future emissions under a number of different constraints.

SUMMARY

This disclosure describes one or more embodiments of methods, non-transitory computer readable media, and systems that solve the foregoing problems (in addition to providing other benefits) by generating action recommendations for modifying physical emissions sources of an entity based on past and modeled emissions for the entity utilizing a mixed integer programming algorithm. Specifically, the disclosed systems monitor emissions produced by an entity by determining a number of physical emissions sources corresponding to an entity and a plurality of emissions values for the physical emissions sources. Additionally, the disclosed systems determine a plurality of constraints corresponding to the physical emissions sources and/or operations associated with the entity. The disclosed systems also determine goals for the entity including target emissions values for a future time period. The disclosed systems utilize a multi-variable objective algorithm (e.g., a modified gradient descent model) to iteratively adjust usage and emissions values for the physical emissions sources to obtain the target emissions values according to the provided constraints. The disclosed systems further generate action recommendations for modifying the physical emissions sources based on the results provided by the modified gradient descent model and provide the action recommendations for display within a graphical user interface. Additionally, the disclosed system determines whether a solution is possible given the provided constraints, and if not, provides suggestions for relaxing/modifying the constraints to obtain a solution. The disclosed systems thus utilize a mixed integer programming algorithm to efficiently, accurately, and flexibly monitor large numbers of physical emissions sources for generating action recommendations to an entity.

BRIEF DESCRIPTION OF THE DRAWINGS

Various embodiments will be described and explained with additional specificity and detail through the use of the accompanying drawings in which:

FIGS. 8A-8F illustrate chart diagrams of past data and modeled data for physical emissions sources corresponding to an entity in accordance with one or more implementations.

DETAILED DESCRIPTION

Figure 1:
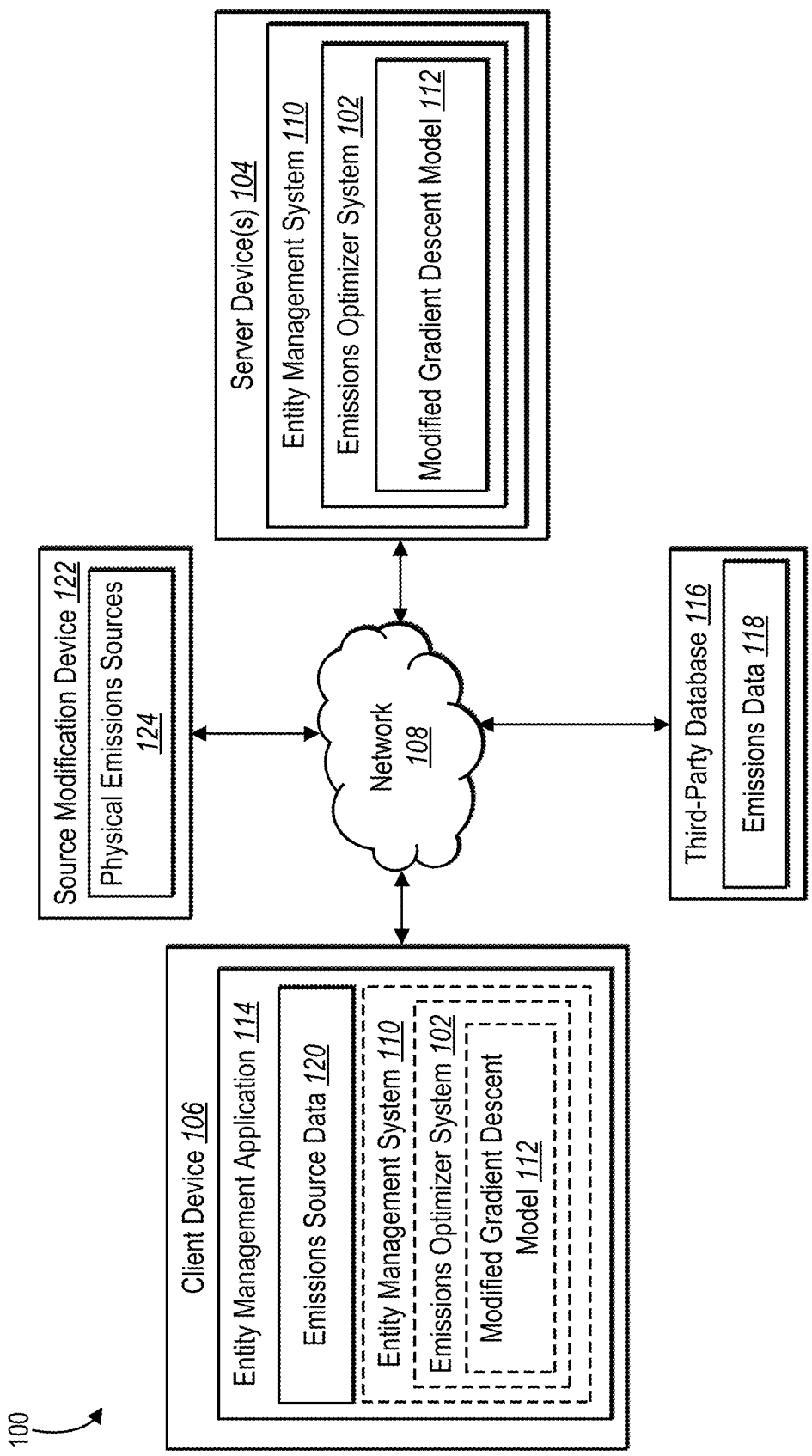
FIG. 1 illustrates an example of a system environment in which an emissions optimizer system can operate in accordance with one or more implementations.

This disclosure describes one or more embodiments of an emissions optimizer system that monitors emissions produced by entities and generates action recommendations utilizing a mixed integer programming algorithm for the entities to modify physical emissions sources according to the action recommendations. In one or more embodiments, the emissions optimizer system determines physical emissions sources associated with an entity and emissions amounts/types produced by the identified physical emissions sources. The emissions optimizer system also determines (e.g., in response to user interactions with graphical user interface elements) various constraints associated with the entity and one or more target emissions values for the entity for a future time period. The emissions optimizer system utilizes a modified gradient descent model to iteratively adjust emissions values for the emissions sources to determine whether the entity can achieve the target emissions values given the various constraints. Furthermore, the emissions optimizer system generates action recommendations to provide for display within a graphical user interface based on the results generated by the gradient descent model.

As mentioned, in one or more embodiments, the emissions optimizer system determines emissions sources associated with an entity. Specifically, the emissions optimizer system determines a number of physical emissions sources of different types in connection with the entity. For example, the emissions optimizer system determines emissions sources that generate emissions from operations associated with the entity. Furthermore, the emissions optimizer system determines emission types generated by each of the emissions sources.

Additionally, in one or more embodiments, the emissions optimizer system determines emissions values of emissions produced by the physical emissions sources. For instance, the emissions optimizer system determines emissions values for each emission type in connection with each emissions source. To illustrate, the emissions optimizer system accesses a database (e.g., a third-party database) including standardized emissions values to determine emissions values for the physical emissions sources associated with the entity.

According to some embodiments, the emissions optimizer system determines one or more target emissions values in connection with one or more goals for the entity to achieve for a future time period. In particular, the emissions optimizer system determines target emissions values for reducing the emissions produced by emissions sources of the entity within a given amount of time relative to measured/estimated emissions values of one or more previous time periods for the entity. The emissions optimizer system can also determine optimal costs based on one or more constraints or target costs associated with the entity. In addition, in one or more embodiments, the emissions optimizer system determines various constraints in connection with the one or more goals. To illustrate, the emissions optimizer system determines constraints associated with the physical emissions sources, financial/budgetary factors, or other operational factors associated with the entity.

After determining the target values and constraints associated with the entity, the emissions optimizer system generates action recommendations for achieving the target values. Specifically, the emissions optimizer system utilizes a modified gradient descent model to adjust usage and emissions values for the physical emissions sources, which allows the emissions optimizer system to determine whether the entity is able to achieve the target values given the constraints. More specifically, the emissions optimizer system utilizes the modified gradient descent model to iteratively adjust various emissions values corresponding to specific physical emissions sources according to the constraints. Additionally, in some embodiments, the emissions optimizer system iteratively adjusts the emissions values based on contribution proportions of the physical emissions sources to the emissions values corresponding to the entity.

In one or more embodiments, the emissions optimizer system provides the action recommendations for display within a graphical user interface. For example, the emissions optimizer system generates the action recommendations utilizing a natural language processing engine to convert data resulting from the modified gradient descent model into natural language action recommendations. In additional embodiments, the emissions optimizer system generates action recommendations in various formats based on the data resulting from the modified gradient descent model. The emissions optimizer system provides the action recommendations to a client device for display within a graphical user interface.

As mentioned, conventional systems have a number of shortcomings in relation to managing and modeling emissions associated with entity operations. For example, some conventional systems for controlling the operations of physical emissions sources rely on tools that track data such as inventory, labor, or other aspects of entity operations. While such conventional systems provide useful insights regarding such emissions, the conventional systems are unequipped to configure emissions sources for compliance with recent emissions standards or to manage emissions measuring and reporting according to recent emissions standards. Due to the inability of conventional systems to track or model emissions sources and emissions production, entities attempting to control the operations of emissions sources consistently with operational goals via conventional systems must manually monitor emissions sources. Given the large number of physical emissions sources (and different types of emissions sources) and other variables involved with tracking and modeling emissions for even small entities, however, manually tracking and/or predicting emissions via conventional systems is inefficient and inaccurate.

The disclosed emissions optimizer system provides a number of advantages over conventional systems. For example, the emissions optimizer system provides flexibility for computing systems that control operations of physical emissions sources by tracking and modeling emissions produced by large numbers of various physical emissions sources for an entity. In particular, in contrast to conventional systems that are unable to configure emissions sources (thus requiring manual monitoring and configuration by entities), the emissions optimizer system automatically tracks and models emissions values for past and future time periods for different types of entities with different emissions sources. To illustrate, by managing an entity's emissions consistent with other operational data of the entity, the emissions optimizer system provides up-to-date, detailed emissions data that allows entity's to easily generate a plan for reducing emissions. The emissions optimizer system also provides optimal parameters for an entity's business or financial constraints while achieving specified emissions and cost goals. In addition, the emissions optimizer system is able to automatically determine whether a solution is possible given the various constraints and goals and suggests various modifications to the constraints or goals to obtain a solution.

Furthermore, the emissions optimizer system also improves efficiency of computing devices and systems for controlling operations of emissions sources. Specifically, the emissions optimizer system utilizes a modified gradient descent model to quickly and efficiently model emissions values for large numbers of emissions sources for applying modifications to operations of emissions sources for future time periods. For instance, the emissions optimizer system utilizes the modified gradient descent model to iterate through many emissions sources (e.g., hundreds or thousands of different emissions sources). Accordingly, the emissions optimizer system quickly determines and applies modifications to specific physical emissions sources that are most impactful to emissions without needing to iterate through every possible combination of modifications. In other words, the emissions optimizer system provides improvements over conventional computing systems that utilize brute force computations by utilizing the modified gradient descent model to efficiently converge on optimal or near optimal modifications in less time while utilizing fewer computing resources. The emissions optimizer system also efficiently generates action recommendations for implementing the modifications to the specific physical emissions sources while taking additional variables (e.g., target emissions values and various constraints) into account that otherwise significantly increase the complexity of the optimization process with conventional systems.

Additionally, the emissions optimizer system also provides improved accuracy for computing systems that control emissions sources. For example, the emissions optimizer system provides configuration of a plurality of physical emissions sources by utilizing the modified gradient descent model to iteratively process emissions values for the physical emissions sources within a plurality of defined constraints and one or more target emissions values. By utilizing a modified gradient descent model to generate action recommendations for modifying physical emissions sources for an entity given the constraints and target emissions value(s), the emissions optimizer system can accurately determine specific actions for modifying the operations of the emissions sources to achieve specific goals while also complying with the various constraints. The emissions optimizer system also utilizes the modified gradient descent model to determine whether target emissions values are possible given the constraints and physical emissions sources and accurately determine actions for updating constraints or target emission values if not possible.

Turning now to the figures, FIG. 1 includes an embodiment of a system environment 100 in which an emissions optimizer system 102 is implemented. In particular, the system environment 100 includes server device(s) 104 and a client device 106 in communication via a network 108. Moreover, as shown, the server device(s) 104 include an entity management system 110, which includes the emissions optimizer system 102. As further illustrate in FIG. 1, the emissions optimizer system 102 includes a modified gradient descent model 112. Additionally, the client device 106 includes an entity management application 114, which optionally includes the entity management system 110 and the emissions optimizer system 102, which further includes the modified gradient descent model 112. In additional embodiments, as illustrated in FIG. 1, the system environment 100 includes a third-party database 116, which includes emissions data 118. In further embodiments, the system environment 100 includes a source modification device 122, which manages operations for physical emissions sources 124.

As shown in FIG. 1, in one or more implementations, the server device(s) 104 includes or hosts the entity management system 110. Specifically, the entity management system 110 includes, or is part of, one or more systems that implement management of entity operations. For example, the entity management system 110 provides tools for generating, viewing, or otherwise interacting with operational data (e.g., inventory, labor, emissions data) associated with an entity. To illustrate, the entity management system 110 communicates with the client device 106 via the network 108 to provide the tools for display and interaction via the entity management application 114 at the client device 106. Additionally, in some embodiments, the entity management system 110 receives data from the client device 106 in connection with managing operational data associated with the entity, including requests to perform operations based on digital content stored at the server device(s) 104 (or at another device such as a source repository) and/or requests to store digital content from the client device 106 at the server device(s) 104 (or at another device). In some embodiments, the entity management system 110 receives interaction data for generating or viewing operational data based on digital content (e.g., emissions source data 120) at the client device 106, processes the interaction data (e.g., to generate or edit operational data), and provides the results of the interaction data to the client device 106 for display via the entity management application 114 or to a third-party system.

In one or more embodiments, the entity management system 110 provides tools for generating operational data (including emissions data) for an entity. In particular, the entity management system 110 provides tools (e.g., via the entity management application 114) for selecting, viewing, or generating emissions data or action recommendations corresponding to the emissions data. Additionally, the entity management system 110 utilizes the emissions optimizer system 102 to intelligently generate action recommendations for modifying physical emissions sources corresponding to an entity based on the emissions source data 120 provided by the client device. The emissions optimizer system 102 also utilizes a database (e.g., the third-party database 116) including emissions data 118 for determining emissions values corresponding to the emissions source data 120. For example, the emissions optimizer system 102 utilizes the modified gradient descent model 112 to iteratively adjust emissions values based on the emissions source data 120 according to on one or more target values. Furthermore, in one or more embodiments, the emissions optimizer system 102 utilizes the modified gradient descent model 112 to generate the action recommendations based on a plurality of constraints provided to the entity management system 110 (e.g., from the client device 106).

In one or more embodiments, after the emissions optimizer system 102 generates action recommendations for modifying physical emissions sources associated with an entity, the entity management system 110 provides the action recommendations to the client device 106 for display. For instance, the entity management system 110 sends the action recommendations to the client device 106 via the network 108 for display via the entity management application 114. Additionally, the client device 106 can receive additional inputs to apply additional changes to the emissions source data 120, constraints, and/or target emissions values. The entity management system 110 utilizes the emissions optimizer system 102 to generate additional action recommendations based on the updated emissions source data 120, constraints, and/or target emissions values.

According to one or more embodiments, the entity management system 110, the emissions optimizer system 102, and/or the client device 106 provide instructions for implementing one or more actions based on the action recommendations to the source modification device 122 (or a plurality of source modification devices). To illustrate, in response to a user interaction via the client device 106 to select one or more action recommendations, the client device 106 or the emissions optimizer system 102 sends instructions to the source modification device 122 to perform one or more corresponding operations for modifying the physical emissions sources 124. The source modification device 122 performs the operation(s) by modifying the physical emissions sources 124, such as by establishing/modifying control limits that limit operations of one or more physical emissions sources (e.g., setting automatic time limits, turning on/off specific sources, restricting use based on time/usage thresholds, controlling gas/electricity flow, travel budget availability for employees).

In additional embodiments, the server device(s) 104 provide source modification instructions directly to the source modification device 122 such that the source modification device 122 automatically applies the modifications to the physical emissions sources 124. Accordingly, the source modification device 122 includes devices or machinery that modify operations associated with the physical emissions sources 124. In one or more embodiments, the source modification device 122 includes a computing device (or other physical control device including a processor) for executing instructions related to controlling the physical emissions sources 124.

Specifically, in one or more embodiments, the emissions optimizer system 102 sends instructions to the source modification device 122 (a controller, a central processing device, a thermostat, etc.) to modify operations of a physical emission source 124 (e.g., an oven, an HVAC system, a furnace, a boiler, a water heater, light bulbs, etc.). For example, the emissions optimizer system 102 sends instructions to source modification device 122 to limit operation of a physical emission source 124 to certain hours during the day, to a certain number of hours a day, or to stay within one or more operating parameters (e.g., minimum/maximum temperature, minimum/maximum speed, minimum/maximum power).

In one or more embodiments, the server device(s) 104 include a variety of computing devices, including those described below with reference to FIG. 10. For example, the server device(s) 104 includes one or more servers for storing and processing data associated with operational data, emissions data, and action recommendations for modifying physical emissions sources for an entity. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 10. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with digital content (e.g., emissions source data, emissions data, action recommendations). In some embodiments, the client device 106 also performs functions for generating, capturing, or accessing data to provide to the entity management system 110 and the emissions optimizer system 102 in connection with entity management. For example, the client device 106 communicates with the server device(s) 104 via the network 108 to provide information (e.g., user interactions) associated with generating action recommendations. Although FIG. 1 illustrates the system environment 100 with a single client device 106, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 10.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the emissions optimizer system 102 being implemented by a particular component and/or device within the system environment 100, the emissions optimizer system 102 can be implemented, in whole or in part, by other computing devices and/or components in the system environment 100 (e.g., the client device 106).

In particular, in some implementations, the emissions optimizer system 102 on the server device(s) 104 supports the emissions optimizer system 102 on the client device 106. For instance, the emissions optimizer system 102 on the server device(s) 104 generates or trains the emissions optimizer system 102 (e.g., the modified gradient descent model 112) for the client device 106. The server device(s) 104 provides the generated/trained emissions optimizer system 102 to the client device 106. In other words, the client device 106 obtains (e.g., downloads) the emissions optimizer system 102 from the server device(s) 104. At this point, the client device 106 is able to utilize the emissions optimizer system 102 to generate operational/emissions data and action recommendations independently from the server device(s) 104.

In alternative embodiments, the emissions optimizer system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform emissions data and action recommendation generation operations, and, in response, the emissions optimizer system 102 or the entity management system 110 on the server device(s) 104 performs operations to generate emissions data and action recommendations. The server device(s) 104 provide the output or results of the operations to the client device 106.

Figure 2:
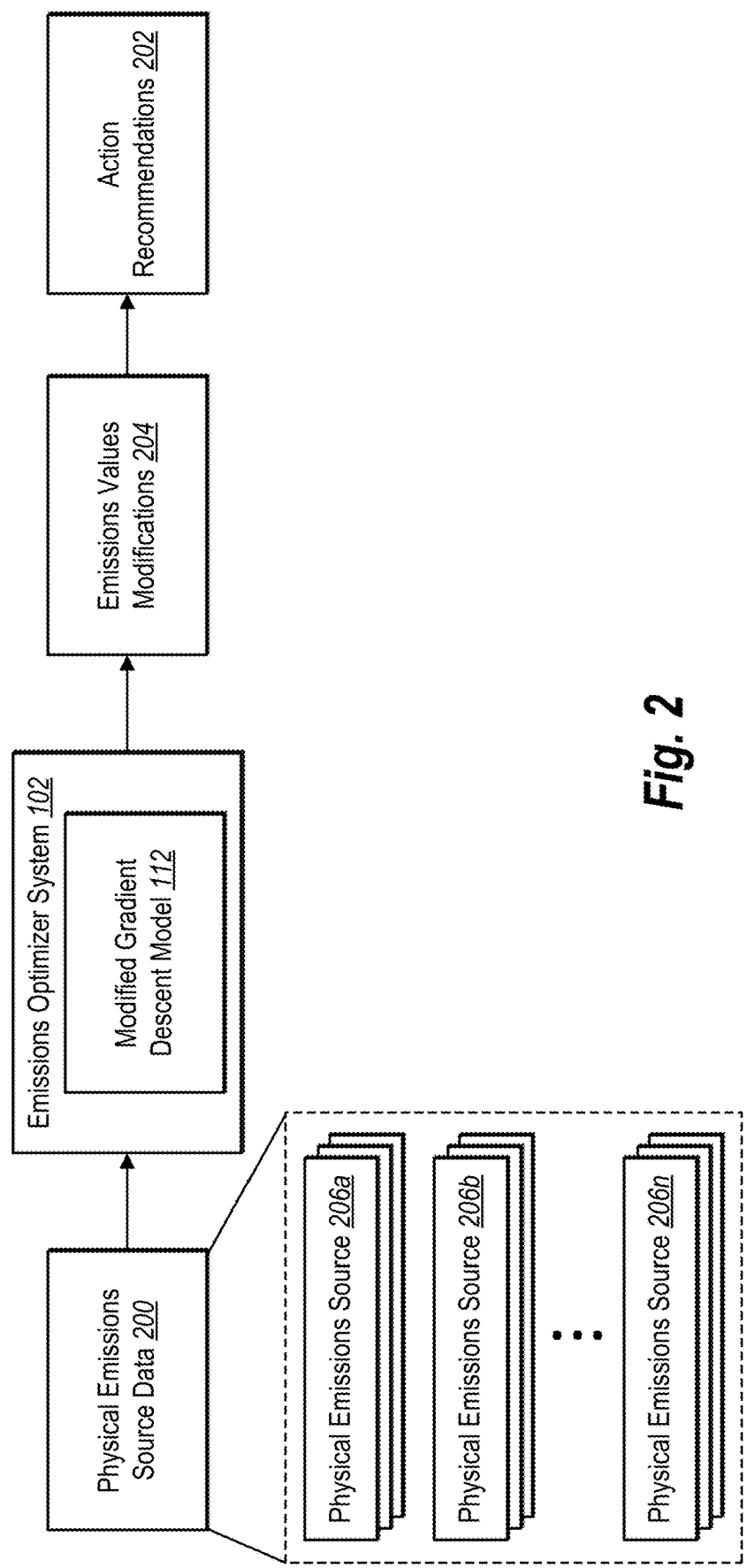
FIG. 2 illustrates an example of an overview of a process of the emissions optimizer system utilizing a modified gradient descent model to generate action recommendations for modifying physical emissions sources in accordance with one or more implementations.

As mentioned, the emissions optimizer system 102 utilizes data indicating emissions produced by an entity to generate action recommendations for modifying one or more physical emissions sources. FIG. 2 illustrates an overview of the emissions optimizer system 102 processing physical emissions source data 200 to generate action recommendations 202. Specifically, the emissions optimizer system 102 utilizes the modified gradient descent model 112 to generate emissions values modifications 204 from the physical emissions source data 200. The emissions optimizer system 102 generates the action recommendations 202 from the emissions values modifications 204.

In one or more embodiments, the emissions optimizer system 102 determines the physical emissions source data 200 in connection with a plurality of physical emissions sources for an entity. For example, the physical emissions source data 200 includes a number and a type of each of a plurality of physical emissions sources corresponding to the entity. FIG. 2 illustrates that the physical emissions source data 200 includes data associated with a plurality of physical emissions source 206a-206n. To illustrate, the physical emissions source data 200 includes a number of units of a first physical emissions source 206a. The physical emissions source data 200 can also include a source type of the first physical emissions source 206a.

In one or more embodiments, a physical emissions source (or "emissions source") includes an object, substance, or action that produces physical emissions. For instance, a physical emissions source includes actions such as, but not limited to, objects, substances, or actions related to travel by employees of an entity or delivery drivers utilizing transportation vehicles (e.g., cars, trucks, airplanes) that the entity may or may not own. In additional examples, a physical emissions source includes objects or substances such as, but not limited to, utilities (e.g., electricity, natural gas, water) on properties owned or used by an entity, vehicles owned or used by an entity, gases or fuels used by furnaces or heating elements, cooking tools such as stoves or ovens, manufacturing tools including assembly lines or individual parts of an assembly line, or agricultural byproducts that generate physical emissions.

According to one or more embodiments, emissions (or "physical emissions") include specific substances generated or produced by one or more sources. For example, emissions include specific gases or liquids. To illustrate, the emissions optimizer system 102 determines emissions that are categorized as greenhouse gases that absorb and emit radiant energy within a thermal infrared range and are correlated with (or cause) the greenhouse effect in relation to climate change. Specifically, physical emissions include various factors such as, but not limited to, carbon dioxide, methane, nitrous oxide, water vapor, or ozone. Additionally, in one or more embodiments, the emissions optimizer system 102 determines various climate change factors based on physical emissions recognized in emissions standards including, but not limited to, a CO2 factor, a CH4 factor, a N2O factor, a BIO CO2 factor, an AR4 (CO2e) factor, and an AR5 (CO2e) factor.

Furthermore, in one or more embodiments, the emissions optimizer system 110 utilizes the modified gradient descent model 112 to generate the emissions values modifications 204 based on adjustments to emissions values corresponding to the physical emissions source data 200. Specifically, as described in more detail with respect to FIG. 3 and FIG. 4, the emissions optimizer system 102 utilizes the modified gradient descent model 112 to iteratively adjust emissions values for different physical emissions sources to attempt to achieve one or more target emissions values. Additionally, the emissions optimizer system 102 generates the action recommendations 202 based on the emissions values modifications 204 to provide to the entity.

Figure 3:
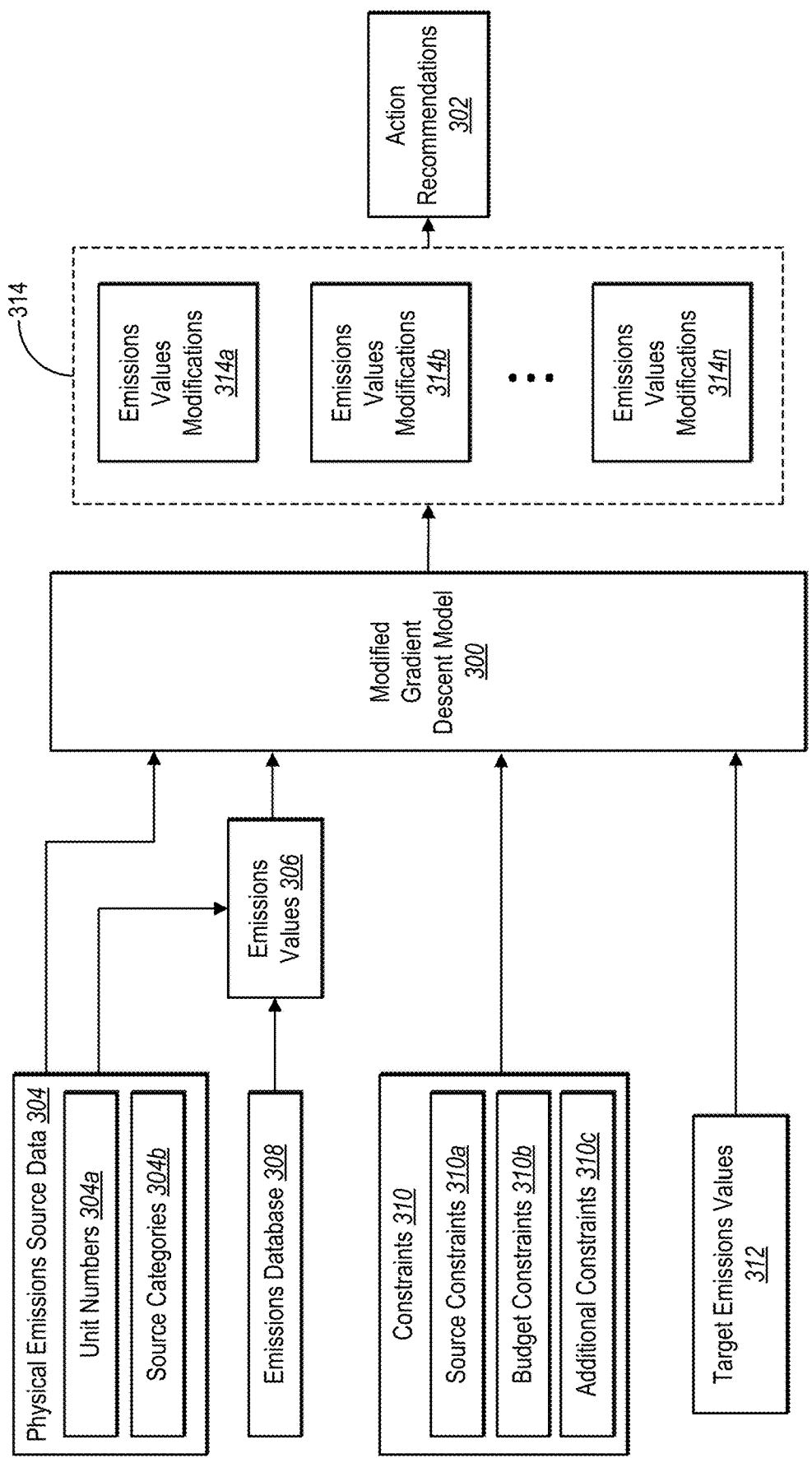
FIG. 3 illustrates an example of a detailed process of the emissions optimizer system utilizing a modified gradient descent model to generate action recommendations for modifying physical emissions sources in accordance with one or more implementations.

FIG. 3 illustrates a diagram of a detailed process of the emissions optimizer system generating action recommendations for modifying physical emissions sources corresponding to an entity. In particular, the emissions optimizer system 102 utilizes a modified gradient descent model 300 to determine one or more actions that the entity may perform to achieve one or more emissions goals given various constraints. For example, the emissions optimizer system 102 utilizes the modified gradient descent model 300 to generate action recommendations 302 to modify physical emissions for meeting the emissions goals.

As illustrated in FIG. 3, the emissions optimizer system 102 determines physical emissions source data 304 for physical emissions sources corresponding to an entity. For example, the emissions optimizer system 102 determines unit numbers 304a indicating a number of units of each physical emissions source type. To illustrate, the emissions optimizer system 102 determines how many delivery drivers are associated with the entity, how many miles the delivery drivers drive during a given time period (e.g., daily, monthly, or yearly), a number of cooking or manufacturing units are associated with the entity, etc. The emissions optimizer system 102 thus determines how many units of a given emissions source the entity uses (or is associated with) during operations of the entity.

In addition to the unit numbers 304a, the emissions optimizer system 102 also determines source categories 304b corresponding to the plurality of physical emissions sources. In some embodiments, each source category produces a specific amount of emissions of one or more emission types. For instance, the emissions optimizer system 102 determines a source category for each physical emissions source based on a source type of the physical emissions source. To illustrate, the emissions optimizer system 102 determines a first source category for a first physical emissions source, a second source category for a second physical emissions source, etc. In additional embodiments the emissions optimizer system 102 determines a plurality of different physical emissions sources for a single source category. Accordingly, the emissions optimizer system 102 assigns a corresponding source category to each unit of a particular type of physical emissions source.

According to one or more embodiments, the emissions optimizer system 102 determines emissions values 306 based on the physical emissions source data 304. Specifically, the emissions optimizer system 102 accesses an emissions database 308 including data for determining how the emissions production of each unit of a particular physical emissions source. To illustrate, the emissions optimizer system 102 accesses the emissions database 308 from a third-party system that determines emissions values according to a standard emissions protocol (e.g., a greenhouse gas protocol "GHG"). In some embodiments, the emissions optimizer system 102 the emissions database 308 includes data indicating emissions values of a plurality of emission types for each unit of each source category. Thus, the emissions optimizer system 102 determines total emissions values produced by the physical emissions sources corresponding to the entity by utilizing the unit numbers 304a, the source categories 304b, and the emissions database 308.

In one or more embodiments, the emissions optimizer system 102 also determines constraints 310 in connection with modifying physical emissions sources for an entity. In particular, the constraints 310 include indications of requirements or limitations that determine boundaries for modifying physical emissions sources. As illustrated in FIG. 3, the constraints 310 include source constraints 310a, budget constraints 310b, and additional constraints 310c. For instance, the source constraints 310a indicate requirements of numbers or types of physical emissions sources (e.g., a minimum unit number of one or more physical emissions sources or source categories). In one or more embodiments, the source constraints 310*a* indicate that an entity has goals that require a certain number of units of one or more emissions sources. Additionally, the source constraints 310*a* can include business constraints related to expansion plans for meeting future sales/operational targets that the entity does not want to compromise (e.g., expanding from 10 locations to 20 locations within 2 years).

In one or more embodiments, the budget constraints 310*b* include financial requirements of operations. For example, the budget constraints 310*b* indicate that an entity has certain financial capabilities for implementing changes related to reducing emissions. To illustrate, the budget constraints 310*b* can include one or more budget limitations for adding or replacing physical emissions sources, such as a budget limitation for replacing a limited number of gas powered vehicles with electric vehicles.

In some embodiments, the additional constraints 310*c* include other constraints not covered by the source constraints 310*a* or the budget constraints 310*b*. Specifically, an entity may have certain operations or actions that the entity does not want to compromise. For instance, an entity may have a certain amount of travel that entity leadership or employees are required to perform within a specific time period that limits the amount of travel reduction available for reducing emissions. The additional constraints 310*c* can also indicate constraints based on obligations that the entity has with one or more other entities.

In one or more embodiments, the emissions optimizer system 102 determines the physical emissions source data 304, the constraints 310, and/or the target emissions values 312 based on user-defined values. For example, the emissions optimizer system 102 determines the physical emissions source data 304, the constraints 310, and/or the target emissions values 312 based on user input provided via one or more client devices associated with the entity. In some instances, the emissions optimizer system 102 also utilizes default values for the physical emissions source data 304, the constraints 310, and/or the target emissions values 312.

In alternative embodiments, the emissions optimizer system 102 automatically determines the physical emissions source data 304, the constraints 310, and/or the target emissions values 312. To illustrate, the emissions optimizer system 102 utilizes a machine-learning model that processes entity data (e.g., operations data) indicating details associated with the entity. The emissions optimizer system 102 determines the physical emissions source data 304, the constraints 310, and/or the target emissions values 312 by estimating numbers of physical emissions sources, future/target physical emissions sources, and/or target emissions values. The emissions optimizer system 102 can also utilize data associated with similar entities to generate estimates of the physical emissions source data 304, the constraints 310, and/or the target emissions values 312.

For example, the emissions optimizer system 102 utilizes a neural network (e.g., a convolutional neural network, recurrent neural network, deep neural network) to generate features representing an entity and a plurality of additional entities (e.g., based on the entity data). The neural network can determine a similarity between the entity and additional entities (e.g., via entity/feature matching). In one or more embodiments, the emissions optimizer system 102 determines physical emissions source data, constraints, and/or target emissions values for the entity based on one or more similar entities.

In one or more embodiments, the emissions optimizer system 102 utilizes the neural network to determine a similarity between the entity and one or more additional entities. For instance, the emissions optimizer system 102 obtains a plurality of attributes of each entity including, but not limited to, entity size, entity type, entity profits/expenses, location, or operations data. The emissions optimizer system 102 utilizes the neural network to encode the attributes (and any learned relationships among the attributes) to generate feature vectors representing the entities. The emissions optimizer system 102 determines similar entities based on distances between the feature vectors (e.g., based on the distances between feature vectors in a feature space). In one or more implementations, the emissions optimizer system 102 determines that the smaller the distance between feature vectors in the features space the greater the similarity between the entities represented by the feature vectors.

In response to determining one or more similar entities to the entity, the emissions optimizer system 102 determines the physical emissions source data, constraints, and/or target emissions values for the entity based on entity data associated with the similar entity/entities. In particular, the emissions optimizer system 102 retrieves entity data from a similar entity and determines corresponding data for an entity based on the retrieved data. To illustrate, in response to determining that a first entity has a similar entity size and entity type as a second entity, the emissions optimizer system 102 utilizes the neural network to determine missing data or estimated data associated with the first entity based on retrieved data for the second entity. In addition, the emissions optimizer system 102 can determine missing/estimated data (or modifications to the entity data) associated with the first entity by averaging corresponding data from a plurality of similar entities (e.g., a weighted average of data from the N most similar entities based on corresponding feature representations). In some instances, the emissions optimizer system 102 also compares the entity data for the first entity to similar entities and notifies the first entity in response to detecting significant deviations from similar entities (e.g., indicating a possible error in the entity data).

As illustrated in FIG. 3, the emissions optimizer system 102 also determines target emissions values 312 for modifying physical emissions sources corresponding to an entity. In one or more embodiments, the emissions optimizer system 102 determines the target emissions values 312 based on emissions goals for a future time period for the entity. For example, the emissions optimizer system 102 determines that emissions goals for reducing emissions produced by the entity by a specific amount/percentage within a specific amount of time (e.g., −20% emissions within two years). In some embodiments, the emissions optimizer system 102 thus determines the target emissions values 312 based on the emissions values 306 and the emissions goals for the entity (e.g., based on one or more percentages of the emissions values 306).

After determining the emissions values 306, the constraints 310, and the target emissions values 312 the emissions optimizer system 102 utilizes the modified gradient descent model 300 to generate the action recommendations 302. Specifically, the emissions optimizer system 102 utilizes the modified gradient descent model 300 to iteratively adjust the emissions values 306 corresponding to the physical emissions sources toward the target emissions values 312. Furthermore, the emissions optimizer system 102 utilizes the modified gradient descent model 300 to adjust the emissions values 306 while meeting the constraints 310.

As mentioned, the number of variables involved in adjusting emissions values for large numbers of physical emissions sources of different types and given various constraints can be very large. To illustrate, even small entities can be associated with tens or hundreds of physical emissions sources, while large entities can be associated with tens of thousands or hundreds of thousands of physical emissions sources. Accordingly, optimizing variables for such large numbers of variables is impractical (or even impossible) utilizing conventional manual methods (e.g., via spreadsheet tools) given current software/hardware limitations. Additionally, adjusting certain emissions values (or corresponding physical emissions sources) can affect other emissions values or violate one or more constraints during optimization, resulting in a complex emissions optimization problem. The emissions optimizer system 102 thus utilizes the modified gradient descent model 300 to generate an emissions reduction plan 314 including a plurality of emissions values modifications 314a-314n. For example, the emissions optimizer system 102 generates a first emission values modification 314a for modifying a first physical emissions source (or source category), a second emissions values modification 314b for modifying a second physical emissions source (or source category), etc. Each emissions values modification includes a plan to meet a specific number of units of a particular physical emissions source for meeting the target emissions values.

In one or more additional embodiments, the modified gradient descent model 300 also determines whether the target emissions values are possible given the emissions values 306 and the constraints 310. In particular, an entity may have established constraints and/or target emissions values that are incompatible with each other. Accordingly, the emissions optimizer system 102 utilizes the modified gradient descent model 300 to determine whether to modify one or more of the constraints 310 and/or target emissions values 312 in addition to any emissions values modifications.

Figure 4:
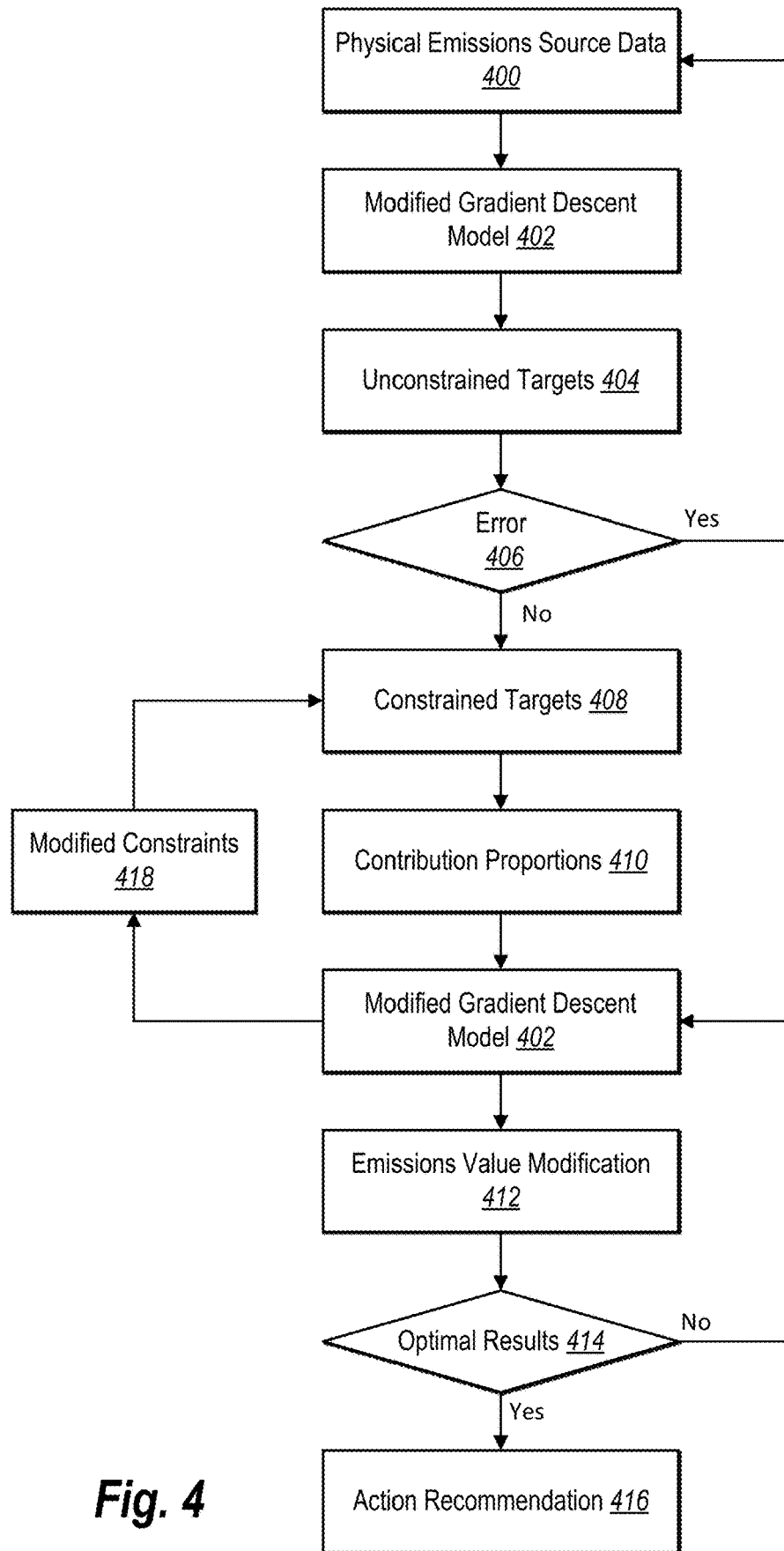
FIG. 4 illustrates an example of the emissions optimizer system utilizing a modified gradient descent model to iteratively adjust emissions values for physical emissions sources in accordance with one or more implementations.

In one or more embodiments, the emissions optimizer system 102 utilizes a modified gradient descent model including a multi-variable objective algorithm such as a mixed-integer linear programming model to iteratively adjust emissions values for a plurality of physical emissions sources. FIG. 4 illustrates a process by which a modified gradient descent model determines emissions value modifications for generating action recommendations to reduce emissions for an entity. Specifically, the emissions optimizer system 102 utilizes the modified gradient descent model to iteratively adjust emissions values for physical emissions sources according to target emissions values and one or more constraints.

As illustrated in FIG. 4, the emissions optimizer system 102 determines physical emissions source data 400 for an entity. In particular, as previously mentioned, the physical emissions source data 400 includes information indicating unit numbers and source types of physical emissions sources corresponding to the entity. For example, the physical emissions source data 400 includes data representing one or more previous time periods (e.g., one or several years of recent data for the entity). In connection with determining the physical emissions source data 400, the emissions optimizer system 102 also determines emissions values based on the physical emissions source data 400.

According to one or more embodiments, the emissions optimizer system 102 utilizes a modified gradient descent model 402 to process the physical emissions source data 400. For example, the emissions optimizer system 102 utilizes the modified gradient descent model 402 according to a set of unconstrained targets 404. Specifically, the emissions optimizer system 102 provides the modified gradient descent model 402 with no constraints to first determine whether the physical emissions source data 400 or emissions values are erroneous or whether the modified gradient descent model or other component has an error. To illustrate, the modified gradient descent model 402 iterates through the emissions values to determine if there is any combination of emissions values that meet the unconstrained targets 404. If the modified gradient descent model 402 does not output any results, the emissions optimizer system 102 determines that there is an error 406 and returns to the physical emissions source data 400 to find and correct the error with the physical emissions source data 400, the corresponding emissions values, and/or the modified gradient descent model 402.

For instance, the modified gradient descent model 402 includes an iterative optimization algorithm that determines a local minimum of a function given a number of variables. In particular, the modified gradient descent model 402 iteratively adjusts a set of initial parameter values to minimize a given cost function. In one or more embodiments, the modified gradient descent model 402 finds the local minimum of a function by performing a plurality of steps proportional to the negative of a gradient, which measures the change in weights relative to the change in error (e.g., a partial derivative with respect to a plurality of input variables). According to one or more embodiments, in response to determining that the gradient reaches a local minimum (e.g., the cost function is as small as possible), the modified gradient descent model 402 terminates. Furthermore, in one or more embodiments, the modified gradient descent model 402 determines a number of results according to the initial parameters and a learning rate. Thus, in some embodiments, the emissions optimizer system 102 modifies the speed of the modified gradient descent model 402 by adjusting the number of input parameters and/or the learning rate associated with the modified gradient descent model 402.

If the modified gradient descent model 402 outputs results, the emissions optimizer system 102 determines that the data/model are not erroneous moves to the next steps (i.e., optimizing the emissions values for the entity). As illustrated, after determining that there is no error in the physical emissions source data 400, the corresponding emissions values, and/or the modified gradient descent model 402, the emissions optimizer system 102 provides a set of constrained targets 408 to the modified gradient descent model 402. In particular, the emissions optimizer system 102 utilizes entity-provided constraints and/or estimated constraints (e.g., via a machine-learning model) to optimize the emissions values.

In one or more embodiments, the emissions optimizer system 102 determines contribution proportions 410 corresponding to the plurality of physical emissions sources to the emissions values. For instance, the emissions optimizer system 102 determines a total emissions value of emissions produced by the physical emissions sources. In additional embodiments, the emissions optimizer system 102 determines total emissions values for a plurality of emission types produced by the physical emissions sources. The emissions optimizer system 102 determines percentage weights of the physical emissions sources (e.g., a weight for each source category) relative to the total emissions value (or to the total emissions value for each emission type). Accordingly, the emissions optimizer system 102 determines how much each physical emissions source (or source category) contributes to the total emissions produced by the entity.

In one or more additional embodiments, the emissions optimizer system 102 determines contributions of the physical emissions sources to one or more additional parameters. For example, the emissions optimizer system 102 determines contribution proportions of the physical emissions sources to total costs associated with the physical emissions sources (e.g., according to predefined cost values assigned based on a source category, emissions, or other data associated with a physical emissions source). To illustrate, the emissions optimizer system 102 determines total costs associated with operations of objects and/or actions corresponding to the physical emissions sources. The emissions optimizer system 102 determines how much each of the physical emissions sources (or source categories) contributes to the total cost.

After determining the contribution proportions 410 of the physical emissions sources to the total emissions value(s) and/or to one or more additional parameters, the emissions optimizer system 102 utilizes the modified gradient descent model 402 to optimize the emissions values for the physical emissions sources based on the constrained targets 408. Specifically, the emissions optimizer system 102 utilizes the modified gradient descent model 402 to iteratively adjust emissions values for the physical emissions sources according to the contribution proportions 410. For instance, the emissions optimizer system 102 ranks/sorts the physical emissions sources according to the contribution proportions 410, such as by sorting the physical emissions sources from highest contribution proportion to lowest contribution proportion.

The emissions optimizer system 102 utilizes the modified gradient descent model 402 to adjust emissions values associated with the physical emissions sources according to the contribution proportions 410. To illustrate, the modified gradient descent model 402 selects the physical emissions source with the highest contribution proportion and adjusts an emissions value of the selected physical emissions source. For example, the modified gradient descent model 402 determines a base unit value for the selected physical emissions source indicating a current/most recent number of units of the physical emissions source. The modified gradient descent model 402 further determines a maximum number of units and a minimum number of units based on one or more constraints provided to the modified gradient descent model 402.

In one or more embodiments, the modified gradient descent model 402 utilizes a search model (e.g., a binary search model) to select an initial value corresponding to an emissions value modification 412 and step the value up or down based on the generated results. With each selected value, modified gradient descent model 402 determines whether costs associated with the value provide optimal results 414 based on one or more thresholds. To illustrate, the modified gradient descent model 402 determines whether emissions values corresponding to the selected value result in emissions values that are lower than a previous iteration. In additional embodiments, the modified gradient descent model 402 determines whether the emissions values corresponding to the selected value result in emissions values lower than a constraint (e.g., an entity-defined emissions goal). In some embodiments, the modified gradient descent model 402 can also (or alternatively) determine whether the selected value lowers the overall emissions values while being higher than one or more constraints (e.g., a minimum unit number).

If the modified gradient descent model 402 generated results and determines that the selected value meets each of the above-indicated thresholds, the emissions optimizer system 102 utilizes the modified gradient descent model 402 to iteratively determine one or more new values while performing the above process again. Specifically, the modified gradient descent model 402 utilizes the search model to iteratively select new values (e.g., by stepping up or down) and determine whether the new value meet the threshold(s). Once the modified gradient descent model 402 determines that a selected value provides results that do not meet one or more of the above-indicated thresholds, the emissions optimizer system 102 may determine that the selected value corresponds to optimal results 414 for the emissions value modification 412.

As illustrated in FIG. 4, the emissions optimizer system 102 generates an action recommendation 416 for providing to the entity to perform the emissions value modification 412. For example, the emissions optimizer system 102 generates the action recommendation 416 including an indication to modify a number of units of a corresponding physical emissions source. In some embodiments (e.g., as described with respect to FIG. 5), the emissions optimizer system 102 utilizes the emissions values to generate the action recommendation 416 in a user-friendly format.

In one or more embodiments, the emissions optimizer system 102 utilizes the modified gradient descent model 402 to continue optimizing the plurality of physical emissions sources until meeting the constrained targets 408. In particular, the emissions optimizer system 102 determines, after optimizing a particular physical emissions source, whether the optimized emissions values meet the constrained targets 408. If not, the emissions optimizer system 102 utilizes the modified gradient descent model 402 to select another physical emissions source (e.g., the next highest contributing physical emissions source) and optimize the newly selected physical emissions source. The emissions optimizer system 102 continues optimizing the physical emissions sources and generating action recommendations for emissions value modifications until meeting the constrained targets 408.

In some embodiments, if the emissions optimizer system 102 iterates through all physical emissions sources and does not meet the constrained targets 408, the emissions optimizer system 102 determines that the constraints and/or the target emissions values are unrealistic (i.e., not possible given the physical emissions sources). Accordingly, in one or more embodiments, the emissions optimizer system 102 utilizes the modified gradient descent model 402 to adjust the emissions values of the physical emissions sources with only the constraints (e.g., with no user-defined target emissions values). If the modified gradient descent model 402 generates valid results, the emissions optimizer system 102 repeats the optimization process for the physical emissions sources to optimize the emissions values as much as possible toward a set of model-defined target emissions values (e.g., default target emissions values).

If the modified gradient descent model 402 does not generate valid results, the emissions optimizer system 102 determines that one or more of the constraints are not possible. According to one or more embodiments, the emissions optimizer system 102 relaxes one or more constraints to determine modified constraints 418 (e.g., by incrementally reducing or increasing specific constraint values) and utilizes the modified gradient descent model 402 to optimize the results, if possible. The emissions optimizer system 102 provides one or more action recommendations in connection with the modified constraints 418. For instance, the emissions optimizer system 102 generates one or more action recommendations to modify one or more physical emissions sources and one or more action recommendations based on the modified constraints 418 for use in determining the constrained targets 408. Furthermore, if the emissions optimizer system 102 determines that the modified gradient descent model 402 is unable to produce valid results with the modified constraints 418, the emissions optimizer system 102 modifies the target emissions values and repeats the process until determining target emissions values that produce valid results.

Figure 5:
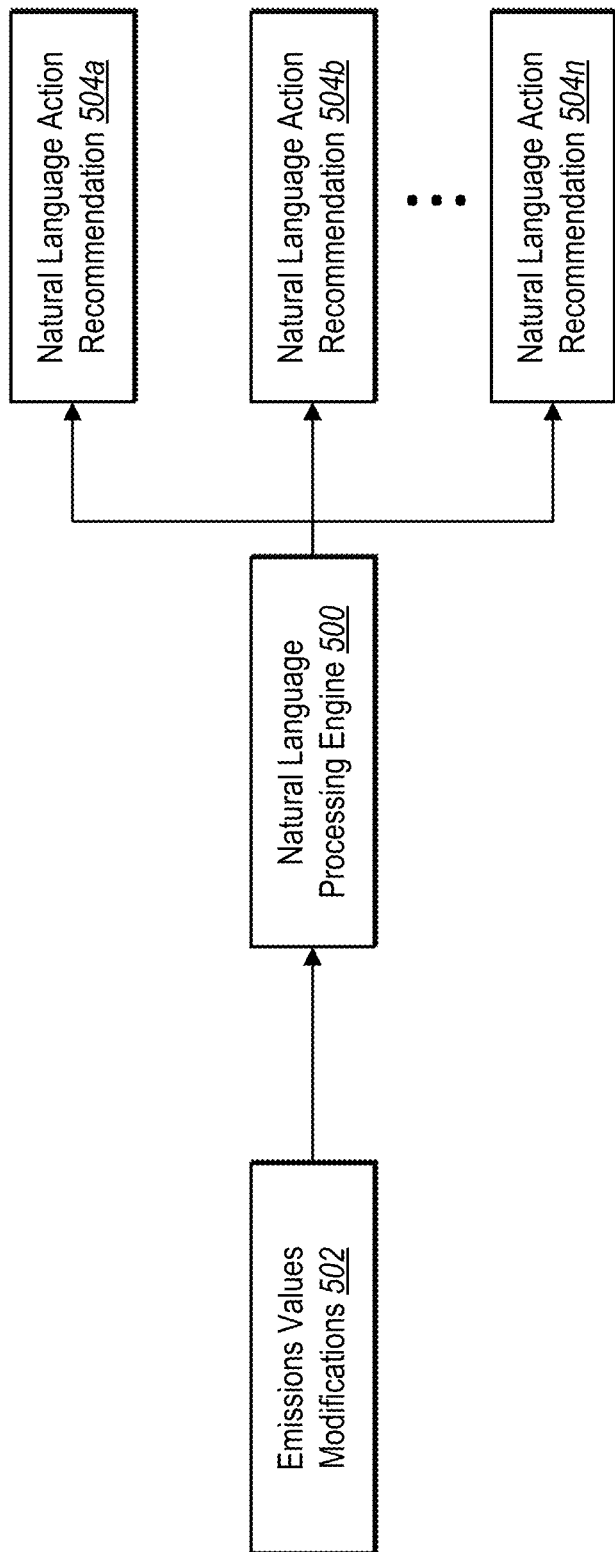
FIG. 5 illustrates an example of the emissions optimizer system utilizing generating natural language action recommendations for modifying emissions values in accordance with one or more implementations.

As mentioned, in one or more embodiments, the emissions optimizer system 102 generates action recommendations in a user-friendly format. FIG. 5 illustrates a diagram of the emissions optimizer system 102 generating natural language recommendations. In particular, the emissions optimizer system 102 utilizes a natural language processing engine 500 to convert or transform emissions values modifications 502 to a plurality of natural language action recommendations 504a-504n. More specifically, the emissions optimizer system 102 utilizes the natural language processing engine 500 to convert data associated with the emissions values modifications 502 into the natural language action recommendations 504a-504n.

In one or more embodiments, the emissions optimizer system 102 utilizes the natural language processing engine 500 to process the emissions values modifications 502. For example, the emissions optimizer system 102 determines physical emissions source data and an emissions values modification for a physical emissions source. The emissions optimizer system 102 utilizes the natural language processing engine 500 to generate one or more natural language phrases or sentences that describe the physical emissions source data and the emissions values modification.

In one or more embodiments, the natural language processing engine 500 includes a neural network that converts structured data into natural language phrases. To illustrate, the natural language processing engine 500 includes a language-based neural network such as a generative transformer-based neural network or a long short-term memory neural network to extract relationships between data points and convert the extracted relationships into natural language phrases referencing the data points. The natural language processing engine 500 converts the physical emissions source data and emissions value modifications to generate natural language phrases indicating one or more actions to achieve a desired result.

For example, the natural language processing engine 500 determines relationships between values in physical emissions source data. In one or more embodiments, the natural language processing engine 500 also determines relationships between initial physical emissions source data and modified physical emissions source data (e.g., based on differences between initial emissions values and modified emissions values). The natural language processing engine 500 converts the relationships to natural language phrases by generating sentences or phrases indicating the relationships or differences.

As discussed above, in one or more embodiments, the emissions optimizer system 102 utilizes a deep-learning based natural language processing model (e.g., an NLP model) to determine intent classifications associated with instances of natural language input. For instance, the emissions optimizer system 102 utilizes a natural language processing engine 500 or NLP model including an encoder layer and a decoder layer.

As mentioned above, the encoder layer receives a structured data input (e.g., the emissions values modifications) and parses the input into words, characters, or character n-grams. In one or more embodiments, the emissions optimizer system 102 embeds the words, characters, or character n-grams into one or more input vectors. For example, the emissions optimizer system 102 can encode the input utilizing one-hot encoding, or a neural embedding based on word semantics.

In one or more embodiments, the emissions optimizer system 102 feeds the generated input vector for each word in the input to the encoder layer including bi-directional LSTM layers. The bi-directional LSTM layers of the encoder layer can each include a first layers and second layers. In at least one embodiment, the first and second layers include series of LSTM units that are organized bi-directionally. In one or more embodiments, the bi-directional organization divides the LSTM units into two directions. For example, half of the LSTM units are organized 'forward,' or in a sequence over increasing sequence instances, while the other half of the LSTM units are organized 'backward,' or in a sequence over decreasing sequence instances. By organizing the LSTM units in opposite directions, the encoder layer can simultaneously utilize content information from the past and future of the current sequence instance to inform the output of the encoder layer.

Generally, each LSTM unit includes a cell, an input gate, an output gate, and a forget gate. As such, each LSTM unit can "remember" values over arbitrary time intervals while regulating the flow of information into and out of the unit. Thus, for example, a first LSTM unit in the first layer of the encoder layer can analyze an input vector encoding the a first input token. A second LSTM unit in the first layer can analyze an input vector encoding a second input token as well as a feature vector from the first LSTM unit (e.g., a latent feature vector encoding significant features of the first input or other previous inputs in the sequence).

The natural language processing engine 500 sequentially models the input, where latent feature vectors of previous layers (corresponding to previous text inputs and training text inputs) are passed to subsequent layers, and where hidden states of text inputs are obtained to generate vectors for each word embedded into the input vector. Each of the layers of the encoder layer further determine relationships between words embedded into the input vector and other contextual information to generate output vectors.

For example, the encoder layer can output a sequence vector that feeds directly into the decoder layer. The decoder layer is configured similarly to the encoder layer with multiple bi-directional LSTM layers. In response to receiving the sequence vector from the encoder layer, the layers of the decoder layer can output a predicted phrase or sentence indicating one or more actions to achieve a desired result based on the physical emissions source data and emissions value modifications.

To illustrate, the emissions optimizer system 102 determines that the physical emissions source data indicates a number of units and/or emissions values for a physical emissions source or an emission type for a previous year and an emissions values modification that indicates a new number of units and/or emissions values for a future time period. The emissions optimizer system 102 utilizes the natural language processing engine 500 to generate a sentence indicating the change in values from the previous time period to the future time period. As an example, the resulting natural language recommendation includes "Reduce natural gas from 15 K in the base year (2020) to 13 K in the target year (2022)." In an additional example, the emissions optimizer system 102 also provides natural language action recommendations in connection with specific business actions such as "Increase electric vehicles from 14 in the base year (2020) to 18 in the target year (2022)." In additional embodiments, the emissions optimizer system 102 also generates natural language recommendations including budgetary implications of emissions values modifications.

In one or more embodiments, the emissions optimizer system 102 utilizes user inputs to further train the natural language processing engine 500. To illustrate, the emissions optimizer system 102 utilizes a selected natural language action recommendation to further train the natural language processing engine 500 for future recommendations (e.g., as a positive example to steer the natural language processing engine 500 to produce similar recommendations/styles in the future). Additionally, the emissions optimizer system 102 utilizes the unselected recommendations as negative examples for training the natural language recommendation engine 500.

Figure 6A:
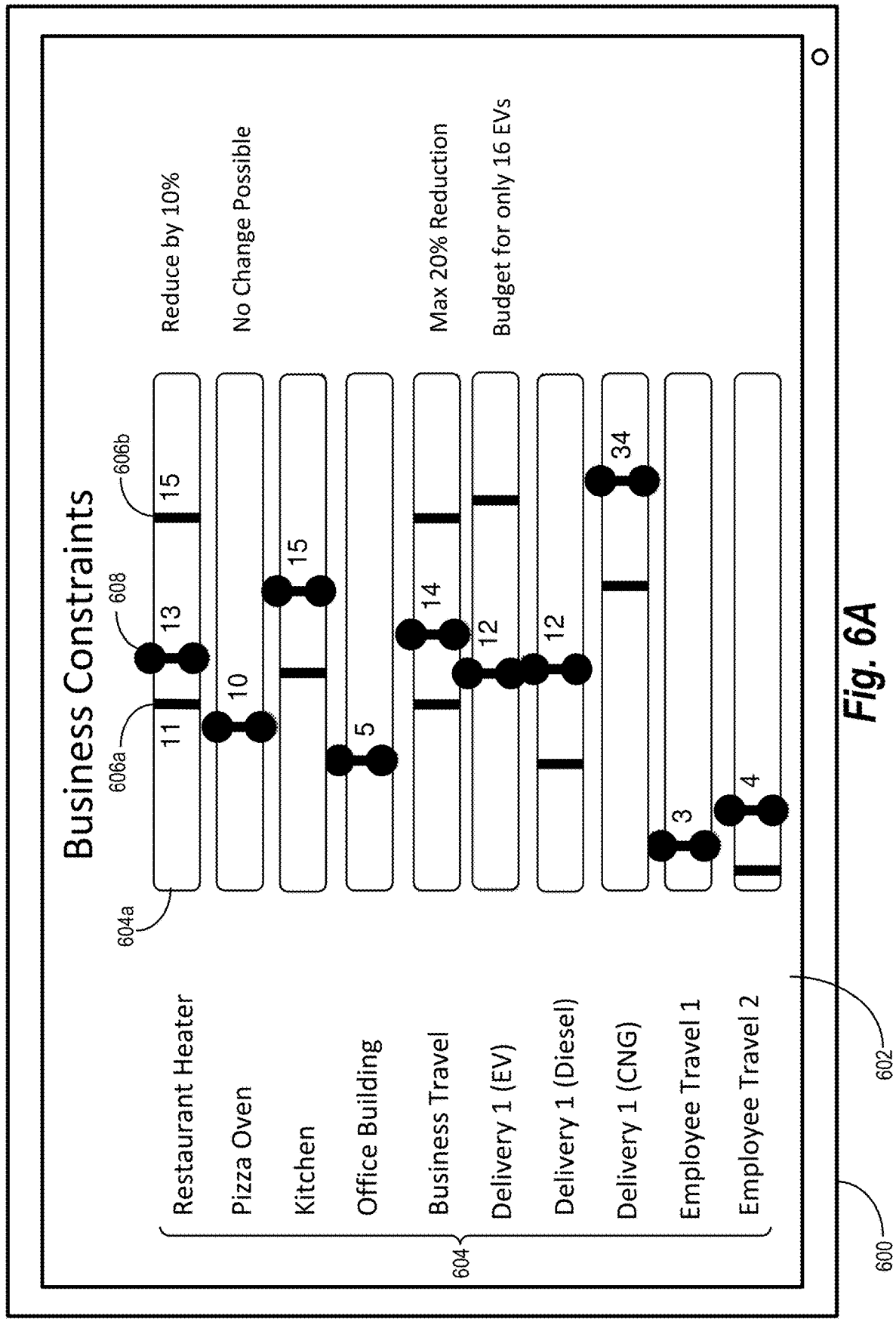
FIGS. 6A-6B illustrate examples of graphical user interfaces including graphical user interface elements for setting a plurality of constraints and a plurality of target emissions values in accordance with one or more implementations.
Figure 6B:
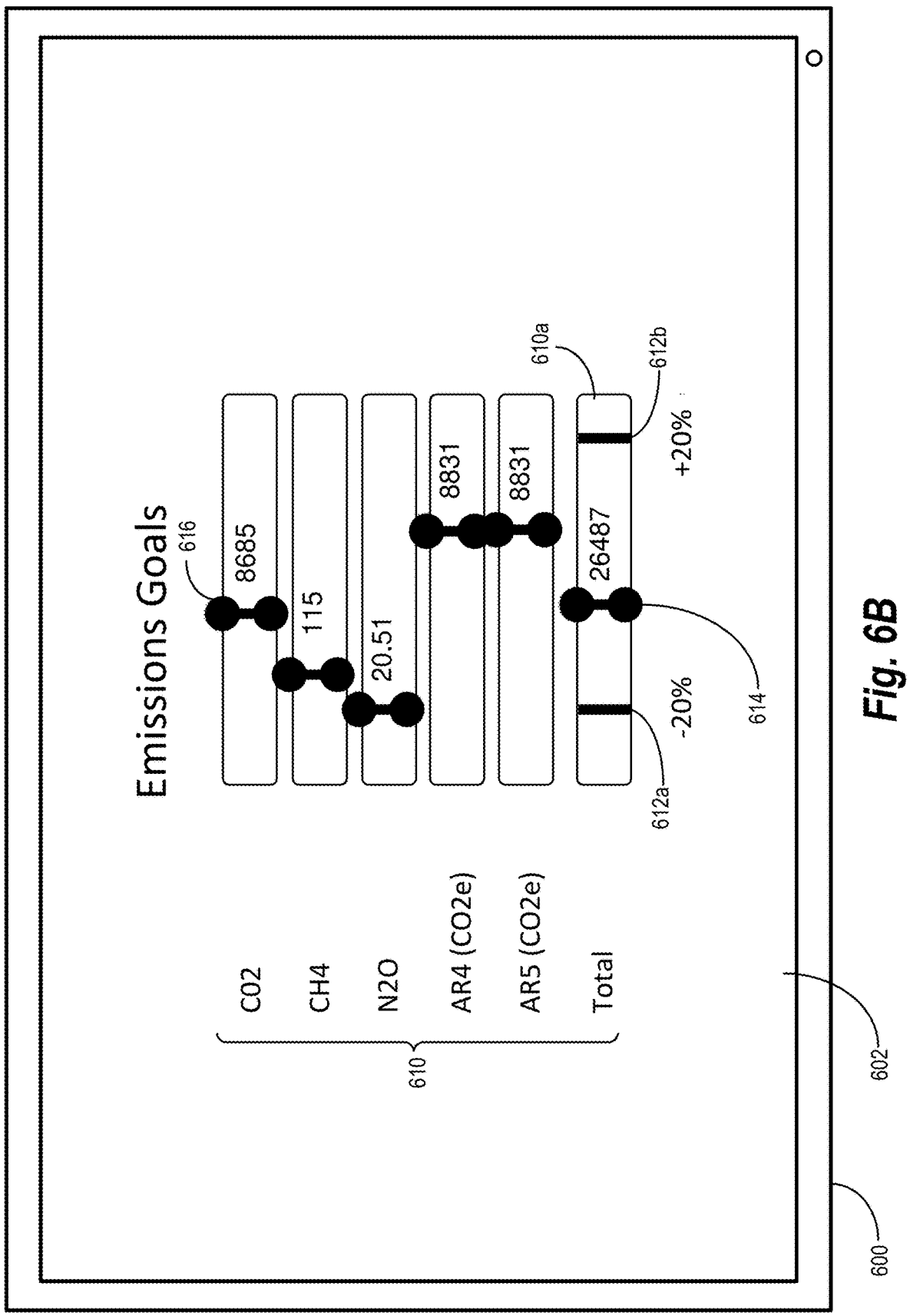

As previously described, in one or more embodiments, the emissions optimizer system 102 determines constraints for determining emissions values modifications. For example, the emissions optimizer system 102 receives user-defined constraints and/or target emissions values for an entity. FIGS. 6A-6B illustrate graphical user interfaces for setting constraints and target emissions values. Specifically, FIG. 6A illustrates a graphical user interface for setting a plurality of constraints for a plurality of physical emissions sources. FIG. 6B illustrates a graphical user interface for setting one or more target emissions values for specific emission types.

FIG. 6A illustrates a client device 600 presenting a graphical user interface of a client application 602 for various entity management operations. Specifically, the client device 600 displays a plurality of graphical user interface elements 604 corresponding to a plurality of different physical emissions sources. For instance, the client device 600 displays a graphical user interface element 604a corresponding to a first physical emissions source (e.g., a "Restaurant Heater") for an entity. In connection with the graphical user interface element 604a, the client device 600 receives user input to define one or more constraints for the first physical emissions source.

To illustrate, the client device 600 displays a minimum constraint 606a indicating a minimum number of units, minimum costs, or other minimum value associated with the first physical emissions source. The client device 600 also displays a maximum constraint 606b indicating a maximum number of units, maximum costs, or other maximum value associated with the first physical emissions source. Accordingly, the emissions optimizer system 102 determines various constraints associated with the physical emissions sources based on user inputs via the client device 600.

As illustrated in FIG. 6A, in one or more embodiments, the client device 600 also displays results generated by the emissions optimizer system 102. In particular, the emissions optimizer system 102 utilizes a modified gradient descent model to generate a plurality of emissions values modifications based on the provided constraints. For instance, the emissions optimizer system 102 generates an emissions value modification for the first physical emissions source based on the minimum constraint 606a and the maximum constraint 606b. The emissions optimizer system 102 provides the emissions value modification to the client device 600, which displays a modification element 608 indicating the emissions value modification. As shown, the emissions optimizer system 102 generated the emissions value modification to include a value between the minimum constraint 606a and the maximum constraint 606b, which provides an easily verifiable, user friendly format for viewing modifications to perform relative to the physical emissions sources.

FIG. 6B illustrates the client device 600 presenting an additional graphical user interface of the client application 602. In particular, the client device 600 displays a plurality of graphical user interface elements 610 corresponding to a plurality of different emission types. For instance, the client device 600 displays a graphical user interface element 610a corresponding to a total emissions representing a combination of all emission produced by physical emissions sources for the entity. In connection with the graphical user interface element 610a, the client device 600 receives user input to define one or more constraints for the total emissions.

To illustrate, the client device 600 displays a minimum constraint 612a indicating a minimum total emissions value for emissions produced by physical emissions sources for the entity. The client device 600 also displays a maximum constraint 612b indicating a maximum total emissions value for emissions produced by physical emissions sources for the entity. In some embodiments, the client device 600 also receives user inputs for setting one or more constraints associated with one or more of the different emission types (minimum/maximum emissions values for a first emission type, minimum/maximum emissions values a second emission type, etc.) The emissions optimizer system 102 thus determines various constraints associated with the emissions produced by the physical emissions sources for the entity based on one or more user inputs via the client device 600.

As illustrated in FIG. 6B, in some embodiments, the client device 600 also displays results generated by the emissions optimizer system 102. In particular, the emissions optimizer system 102 utilizes a modified gradient descent model to generate a target total emissions value. For instance, the emissions optimizer system 102 utilizes the modified gradient descent model to iteratively adjust emissions values for a plurality of physical emissions sources to determine one or more emissions values modifications based on provided constraints (e.g., based on constraints for the physical emissions sources and the emissions values). The emissions optimizer system 102 provides a resulting total emissions value to the client device 600, which displays a total emissions element 614 indicating the resulting total emissions based on one or more emissions value modifications. Additionally, in one or more embodiments, the client device 600 displays emission type elements (e.g., a first emission type element 616) indicating results generated for individual emission types in connection with the resulting total emissions value.

In one or more additional embodiments, the emissions optimizer system 102 provides additional methods for users to indicate constraints and/or target emissions values. For instance, rather than the graphical user interface elements of FIGS. 6A-6B, the emissions optimizer system 102 can provide slider elements, text fields, or other graphical user interface elements. In additional embodiments, the emissions optimizer system 102 utilizes one or more machine-learning models to determine one or more constraints for an entity. Furthermore, after determining one or more predicted constraints utilizing machine-learning models, the emissions optimizer system 102 can also provide the predicted constraints to a client device for confirmation and/or adjustment by a user associated with the entity.

Figure 7:
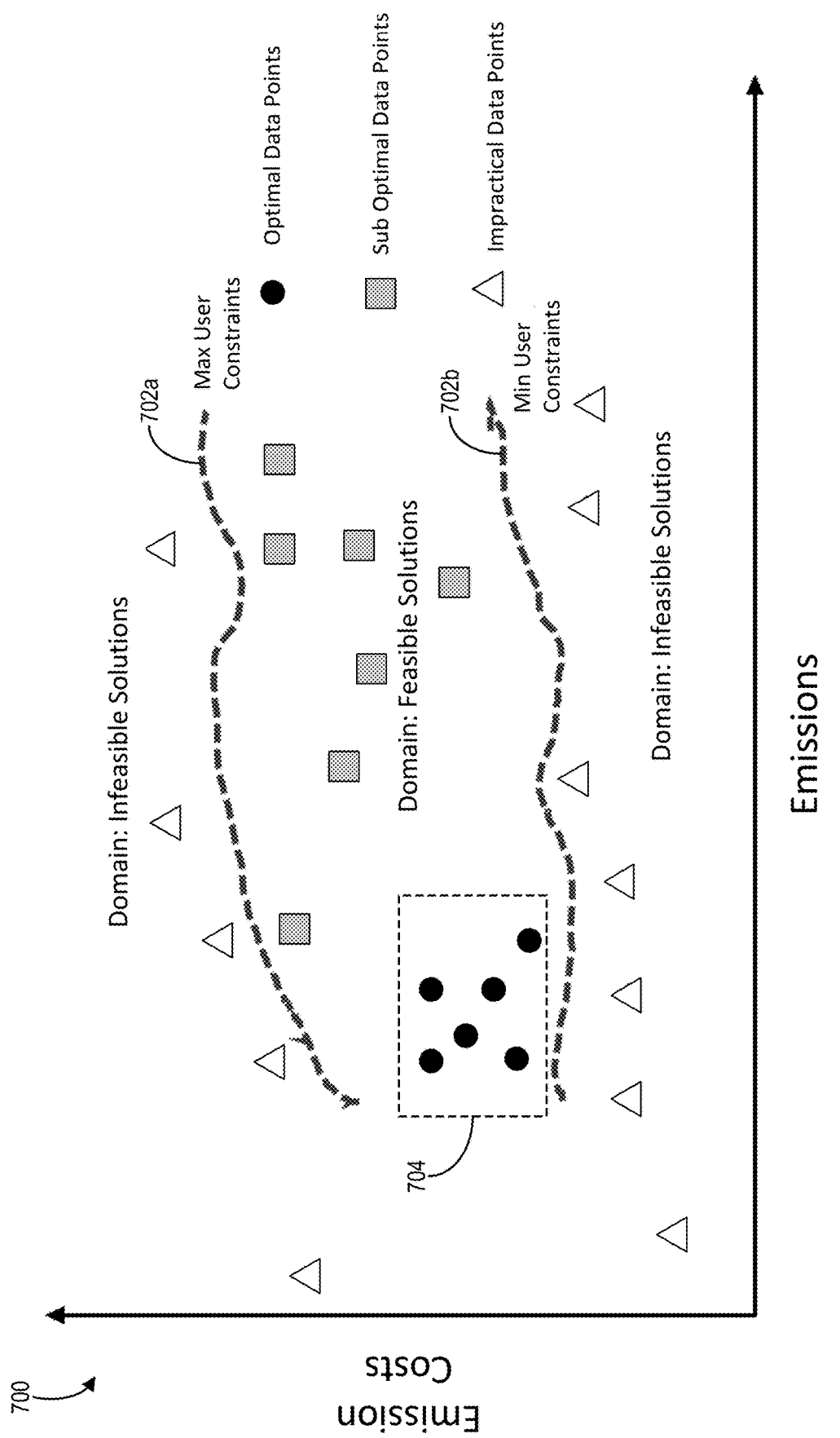
FIG. 7 illustrates examples of sampled data points generated by the emissions optimizer system utilizing a modified gradient descent model in accordance with one or more implementations.

FIG. 7 illustrates a graph diagram 700 of a plurality of results generated via a plurality of iterations of a modified gradient descent model in connection with a plurality of physical emissions sources, a plurality of constraints, and one or more target emissions values. In one or more embodiments, as mentioned, the emissions optimizer system 102 utilizes the modified gradient descent model to iteratively adjust emissions values for a plurality of physical emissions sources according to the constraints and the target emissions value(s). Specifically, the graph diagram 700 represents solutions generated by the modified gradient descent model of emissions (e.g., emissions values) for a plurality of physical emissions sources relative to source costs (e.g., according to predefined emission cost per unit of physical emissions source).

For example, as illustrated in FIG. 7, the emissions optimizer system 102 determines maximum user constraints 702a and minimum user constraints 702b indicating maximum and minimum values, respectively, of source costs. After determining the constraints, the emissions optimizer system 102 utilizes the modified gradient descent model to iteratively adjust emissions values of a plurality of physical emissions sources toward one or more target emissions values. As the modified gradient descent model adjusts the emissions values, the emissions optimizer system 102 also determines whether the resulting emission values meet the maximum user constraints 702a and the minimum user constraints 702b.

To illustrate, the emissions optimizer system 102 determines that results above the maximum user constraints 702a or below the minimum user constraints 702b are infeasible solutions. Furthermore, the emissions optimizer system 102 determines that results that meet the maximum user constraints 702a and the minimum user constraints 702b are feasible solutions. The emissions optimizer system 102 utilizes the modified gradient descent model to iteratively adjusts the emissions values until determining one or more optimal results. Specifically, as illustrated in FIG. 7, the emissions optimizer system 102 determines feasible solutions that meet the constraints but do not meet one or more target emissions values. Accordingly, the emissions optimizer system 102 continues adjusting emissions values to determine optimal results 704 including feasible solutions that meet the constraints and also meet the one or more target emissions values.

As illustrated in FIG. 7, the emissions optimizer system 102 is able to quickly and efficiently determine feasible solutions that meet a set of constraints and target emissions values by adjusting emissions values for individual physical emissions sources in an iterative process. As shown, the solution space can include a very large number of possible solutions (e.g., hundreds or thousands or more) depending on the number of physical emissions sources and constraints. By utilizing the modified gradient descent model with an efficient search model, the emissions optimizer system 102 reduces the number of solutions generated to a small fraction of the total possible solutions. Accordingly, the emissions optimizer system 102 significantly improves the efficiency of a computing device by reducing the computing resources required to generate results that reduce emissions for a plurality of physical emissions sources of the entity.

According to one or more embodiments, the emissions optimizer system 102 determines a plurality of results that meet constraints and also meet target emissions values. For example, the emissions optimizer system 102 determines a plurality of different combinations of emissions value modifications for a plurality of physical emissions sources that each meets the constraints and target emissions values. To illustrate, the emissions optimizer system 102 utilizes the modified gradient descent model to generate a plurality of different results by processing the physical emissions sources according to different criteria (e.g., based on contribution proportions relative to emissions values, contribution proportions relative to source costs, or other sorting methods). The emissions optimizer system 102 provides action recommendations for each result in the optimal results 704.

FIGS. 8A-8F illustrate chart diagrams of an example in which the emissions optimizer system 102 utilizes a modified gradient descent model to generate emissions value modifications for a plurality of physical emissions sources. For example, FIG. 8A illustrates a chart diagram 800 including a plurality of physical emissions sources corresponding to an entity. In one or more embodiments, the physical emissions sources correspond to specific source categories (e.g., "fuel type," "mobile combustion," "transport"). Additionally, the chart diagram 800 includes entity usage including heaters, ovens, buildings, travel, etc., along with the emissions sources such as gas, electricity, fuel, etc. Furthermore, as illustrated in FIG. 8A, the emissions optimizer system 102 determines unit costs, unit sizes, and unit (e.g., "mmBTU," "gal," "vehicle-mile") for each physical emissions source.

In one or more embodiments, as illustrated in FIG. 8A, the emissions optimizer system 102 also determines physical emissions source data for one or more previous time periods. Specifically, the emissions optimizer system 102 determines a number of units for each emissions source for a previous time period (e.g., the most recent year) corresponding to the entity. For example, the emissions optimizer system 102 accesses a database or repository including information about the number of units of the plurality of physical emissions sources for the entity. The physical emissions source data allows the emissions optimizer system 102 to determine emissions, costs, etc., resulting from the plurality of physical emissions sources for the entity.

To illustrate, FIG. 8B illustrates a chart diagram 802 of a plurality of emission types produced by the physical emissions sources for the entity. For instance, the emissions optimizer system 102 accesses a database including emissions data to determine emissions values of a plurality of emission types produced by each physical emissions source. To illustrate, the database includes the amount of emissions generated by a single unit of each physical emissions source. As shown in FIG. 8B, each unit of physical emissions source produces different emission types based on the source category of the physical emissions source. In some embodiments, the emissions optimizer system 102 determines specific emission types based on the entity, such as based on a region of the entity, a size of the entity, or other attributes of the entity, according to local regulations and/or goals of the entity.

FIG. 8C illustrates a chart diagram 804 including constraints for a modified gradient descent model and results generated by the modified gradient descent model based on the constraints and further based on the physical emissions sources of FIG. 8A. In one or more embodiments, the emissions optimizer system 102 determines minimum and maximum source values (e.g., numbers of units of corresponding physical emissions sources). The emissions optimizer system 102 utilizes the modified gradient descent model to generate emissions value modifications by iteratively adjusting the emissions values for the physical emissions sources (e.g., by adjusting the number of units for the physical emissions sources up or down). The chart diagram 804 includes the results from the modified gradient descent model ("Optimizer Output") indicating that the modified gradient descent model produced results within the provided constraints.

FIG. 8D illustrates a chart diagram 806 including comparisons of emissions values and source costs between the base year (2020) and the results of the modified gradient descent model for the entity for a future time period (e.g., 2022). Specifically, the chart diagram 806 includes source costs of the base year according to the number of units of the plurality of physical emissions sources and the source costs associated with the physical emissions sources. In addition, the chart diagram 806 includes the contribution proportions of the physical emissions sources as percentages of the total source costs and the total emissions values for the base year and the modified gradient descent model results. As illustrated, the emission source "CNG—Light-duty vehicles" includes the highest contribution to the total source costs, while the emissions source "Blast Furnace Gas" corresponding to the restaurant heater produces the highest contribution to the total emissions. Furthermore, as illustrated in the chart diagram 806, the results of the modified gradient descent model include higher source costs relative to the source costs of the base year.

While the modified gradient descent model generated results with higher costs for the future time period, the chart diagram 806 also indicates that the modified gradient descent model produced results that reduce emissions for the future time period. Specifically, as illustrated in FIG. 8D, the emissions optimizer system 102 utilizes the modified gradient descent model to adjust emissions values for some of the physical emissions sources relative to the base year. For example, the emissions optimizer system 102 generates emissions value modifications that result in a decrease of total emissions values from 28,133.14 to 26,534.17—a total decrease of 5.6%.

FIG. 8E illustrates a chart diagram 808 including the total emissions values for the plurality of physical emissions sources based on the number of units of each physical emissions source for the base year. Additionally, the chart diagram 808 includes the total emissions values of each emission type contributing to the total emissions values. FIG. 8F illustrates a chart diagram 810 including the total emissions values for the plurality of physical emissions sources based on the number of units of each physical emissions source for the future time period (e.g., results generated by the modified gradient descent model). The chart diagram 810 includes the total emissions values of each emission type contributing to the total emissions values. As shown in FIGS. 8E-8F, the emissions optimizer system 102 provides improved emissions reductions across the plurality of emission types by adjusting emissions values for the plurality of physical emissions sources in accordance with the constraints and one or more target emissions values.

Figure 9:
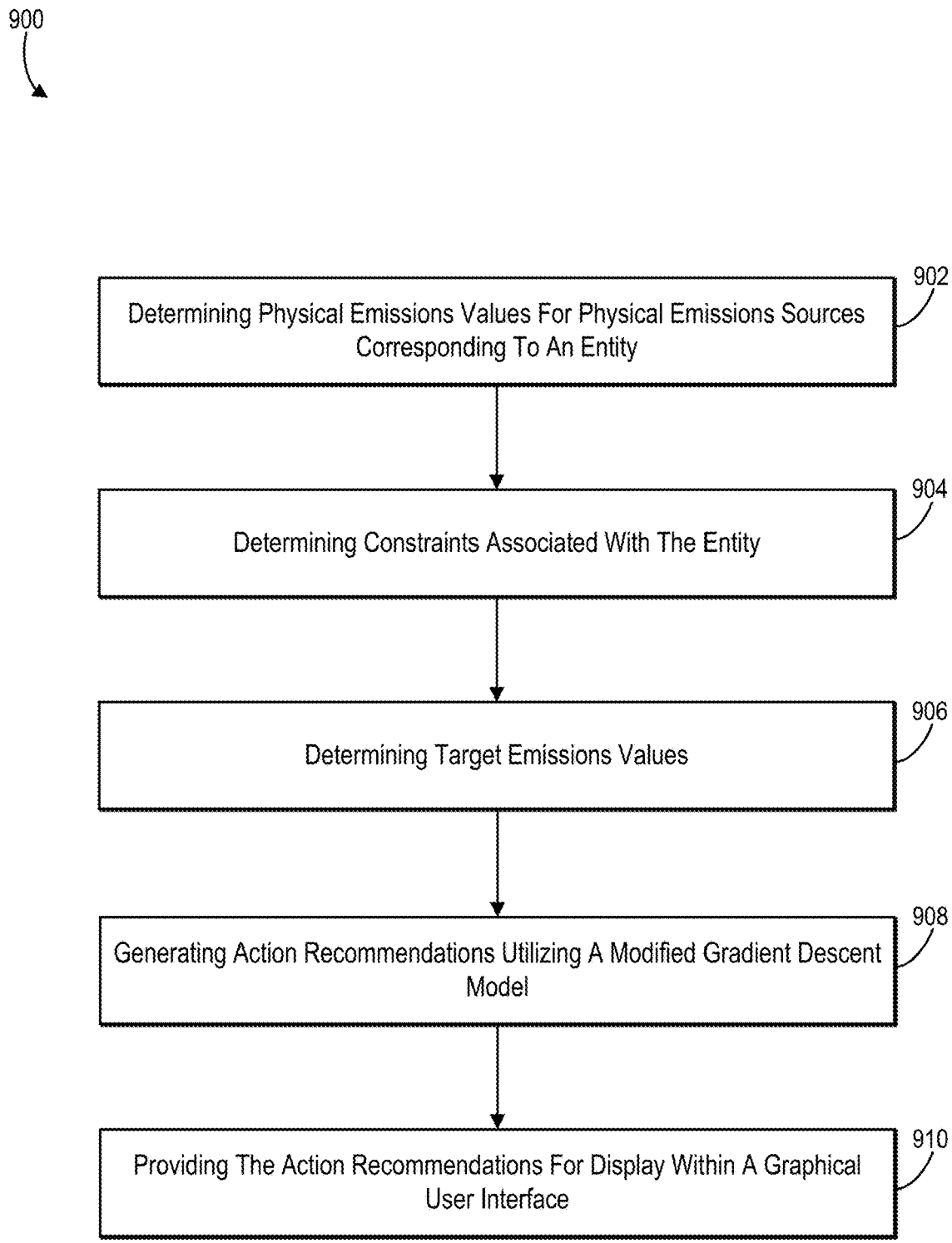
FIG. 9 illustrates a flowchart of a series of acts for utilizing a modified gradient descent model to generate action recommendations to modify physical emissions sources in accordance with one or more implementations.

Turning now to FIG. 9, this figure shows a flowchart of a series of acts 900 of utilizing a modified gradient descent model to generate action recommendations to modify physical emissions sources. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9.

As shown, the series of acts 900 includes an act 902 of determining physical emissions values for physical emissions sources corresponding to an entity. For example, act 902 involves determining a plurality of physical emissions sources corresponding to an entity and a plurality of emissions values for the plurality of physical emissions sources. In one or more embodiments, the entity management system 110 performs act 902 as described above with respect to FIGS. 1 and 2.

Act 902 can involve determining the plurality of emissions values for the plurality of physical emissions sources corresponding to the entity according to a plurality of source categories and unit numbers of the plurality of physical emissions sources. For example, act 902 can involve determining a first set of one or more physical emissions sources of a first source category corresponding to the entity for a previous time period. Act 902 can also involve determining a second set of one or more physical emissions sources of a second source category corresponding to the entity for the previous time period. Act 902 can also involve determining a first emissions value for the first set of one or more physical emissions sources. Act 902 can involve determining a second emissions value for the second set of one or more physical emissions sources.

Act 902 can involve determining, from a database, per-unit emissions values of physical emissions sources for a plurality of source categories. Act 902 can involve determining, for a physical emissions source of the plurality of physical emissions sources, an emissions value based on per-unit emissions values for a source category of the physical emissions source and a number of units of the physical emissions source for the entity.

Additionally, the series of acts 900 includes an act 904 of determining constraints associated with the entity. For example, act 904 involves determining, in response to a plurality of parameters input via a plurality of graphical user interface elements of a graphical user interface, a plurality of constraints associated with the entity. Act 904 can involve providing, for display within the graphical user interface, a plurality of graphical user interface elements for the plurality of physical emissions sources and one or more additional graphical user interface elements for setting the one or more target emissions values. Act 904 can involve determining the plurality of constraints and the one or more target emissions values in response to interactions with the plurality of graphical user interface elements and the one or more additional graphical user interface elements. In some embodiments, the entity management system 110 performs act 904, as described above with respect to FIGS. 1 and 3.

Act 904 can involve receiving, in response to interactions with the plurality of graphical user interface elements, the plurality of constraints comprising a set of constraints for the plurality of physical emissions sources. For example, Act 904 can involve determining, based on the interactions with the plurality of graphical user interface elements, one or more minimum unit values for one or more physical emissions sources of the plurality of physical emissions sources. Additionally, act 904 can involve determining, based on the interactions with the plurality of graphical user interface elements, one or more maximum unit values for one or more physical emissions sources of the plurality of physical emissions sources. To illustrate, act 904 can involve determining, in response to a first parameter input via a first graphical user interface element, a first constraint comprising one or more minimum unit numbers or one or more maximum unit numbers associated with one or more of the plurality of physical emissions sources. Act 904 can also involve determining, in response to a second parameter input via a second graphical user interface element, a second constraint corresponding to operations of the entity or a budget of the entity.

The series of acts 900 also includes an act 906 of determining target emissions values. For example, act 906 involves determining one or more target emissions values for the plurality of physical emissions sources. Act 906 can involve determining a target combined emissions value for the plurality of physical emissions sources. Act 906 can also involve determining a plurality of target emissions values corresponding to a plurality of emission types for the plurality of physical emissions sources. According to one or more embodiments, the emissions optimizer system 102 performs act 906, as described previously with respect to FIGS. 1 and 3.

Furthermore, the series of acts 908 involves generating action recommendations utilizing a modified gradient descent model. For example, act 908 involves generating one or more action recommendations for modifying the plurality of physical emissions sources for the entity by utilizing a modified gradient descent model to iteratively adjust the plurality of emissions values for the plurality of physical emissions sources according to the plurality of constraints and the one or more target emissions values. In one or more embodiments, the emissions optimizer system 102 utilizes the modified gradient descent model 112 to perform act 908, as described above with respect to FIGS. 1 and 4. In some embodiments, the emissions optimizer system 102 also utilizes the natural language processing engine 500 to perform act 908, as described above with respect to FIG. 5.

For example, act 908 involves utilizing the modified gradient descent model to iteratively adjust the plurality of emissions values toward the one or more target emissions values for the plurality of physical emissions sources according to the plurality of constraints and based on contribution proportions of the plurality of physical emissions sources. Act 908 can involve determining an order of contribution proportions of the plurality of physical emissions sources to the plurality of emissions values. Act 908 can involve iteratively adjusting, utilizing the modified gradient descent model, the plurality of emissions values toward the one or more target emissions values according to the plurality of constraints and based on the order of contribution proportions of the plurality of physical emissions sources.

Act 908 can involve determining that modifying a number of units for one or more physical emissions sources of the plurality of physical emissions sources modifies the plurality of emissions values to meet the one or more target emissions values. Act 908 can involve generating the one or more action recommendations to modify the number of units for the one or more physical emissions sources by a target time period.

Act 908 can involve determining, utilizing the modified gradient descent model, a first set of adjusted emissions values for the plurality of physical emissions sources without the plurality of constraints. Act 908 can also involve determining, in response to the modified gradient descent algorithm determining the first set of adjusted emissions values, one or more sets of emissions values for the plurality of physical emissions sources for one or more target time periods according to the plurality of constraints and the one or more target emissions values.

Act 908 can involve determining that the modified gradient descent model returns an error without the plurality of constraints according to initial emissions values for the plurality of physical emissions sources. Act 908 can further involve determining, in response to the error, the plurality of emissions values for the plurality of physical emissions sources by updating the initial emissions values.

Act 908 can involve determining, utilizing the modified gradient descent model, a physical emissions source of the plurality of physical emissions sources that has a highest contribution proportion to the plurality of emissions values. Act 908 can also involve determining, utilizing the modified gradient descent model with a binary search, a modified emissions value meeting the plurality of constraints for the physical emissions source having the highest contribution proportion. For example, act 908 can involve determining, utilizing a binary search model, a first emissions value corresponding to a first physical emissions source having a highest contribution proportion to the plurality of emissions values. Act 908 can also involve determining, utilizing the binary search model, a second emissions value corresponding to a second physical emissions source having a second highest contribution proportion to the plurality of emissions values.

Act 908 can additionally involve determining that the modified gradient descent model is unable to generate emissions values for the plurality of physical emissions sources that meet the plurality of constraints associated with the entity for the one or more target emissions values. For example, act 908 can involve determining, utilizing the modified gradient descent model, that the one or more target emissions values are not possible according to the plurality of constraints. Act 908 can involve determining, utilizing the modified gradient descent model, modified constraints that achieve the one or more target emissions values. Act 908 can also involve generating the one or more action recommendations to modify one or more constraints of the plurality of constraints. For example, act 908 can involve generating an action recommendation to modify the plurality of constraints according to the modified constraints. Furthermore, act 908 can involve, responsive to determining that the one or more target emissions values are not possible according to the plurality of constraints, generating one or more action recommendations to modify the plurality of constraints or the one or more target emissions values.

Act 908 can involve generating, utilizing a natural language processing engine, a natural language action recommendation indicating a modification to one or more emissions values for at least one physical emissions source of the plurality of physical emissions sources.

The series of acts 900 also includes an act 910 of providing the action recommendations for display within a graphical user interface. For example, act 910 involves providing, for display within the graphical user interface, the one or more action recommendations for modifying the plurality of physical emissions sources. In one or more embodiments, the entity management system 110 performs act 910, as described above with respect to FIG. 1.

Act 910 can involve providing the one or more action recommendations for display with the plurality of graphical user interface elements. For example, act 910 can involve providing the one or more action recommendations as modification elements indicating emissions value modifications on top of the plurality of graphical user interface elements. Alternatively, act 910 can involve providing the natural language action recommendation indicating the modification to one or more emissions values for display within the graphical user interface.

In one or more embodiments, the series of acts 900 includes an act of modifying, utilizing one or more source modification devices, one or more physical emissions sources of the plurality of physical emissions sources in response to a selected action recommendation of the one or more action recommendations. For example, the series of acts 900 includes generating, in response to a selected action recommendation of the one or more action recommendations, instructions to modify a physical emissions source according to the selected action recommendation. The series of acts 900 can include providing, in response to a selected action recommendation of the one or more action recommendations, instructions to a source modification device to cause the source modification device to modify a physical emissions source of the physical emissions sources according to the selected action recommendation. The series of acts 900 can include modifying, utilizing the instructions, the physical emissions source via a source modification device corresponding to the physical emissions source. Specifically, the series of acts 900 can include modifying, by the one or more source modification devices, one or more control settings associated with the one or more physical emissions sources that limits usage of the one or more physical emissions sources according to the instructions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
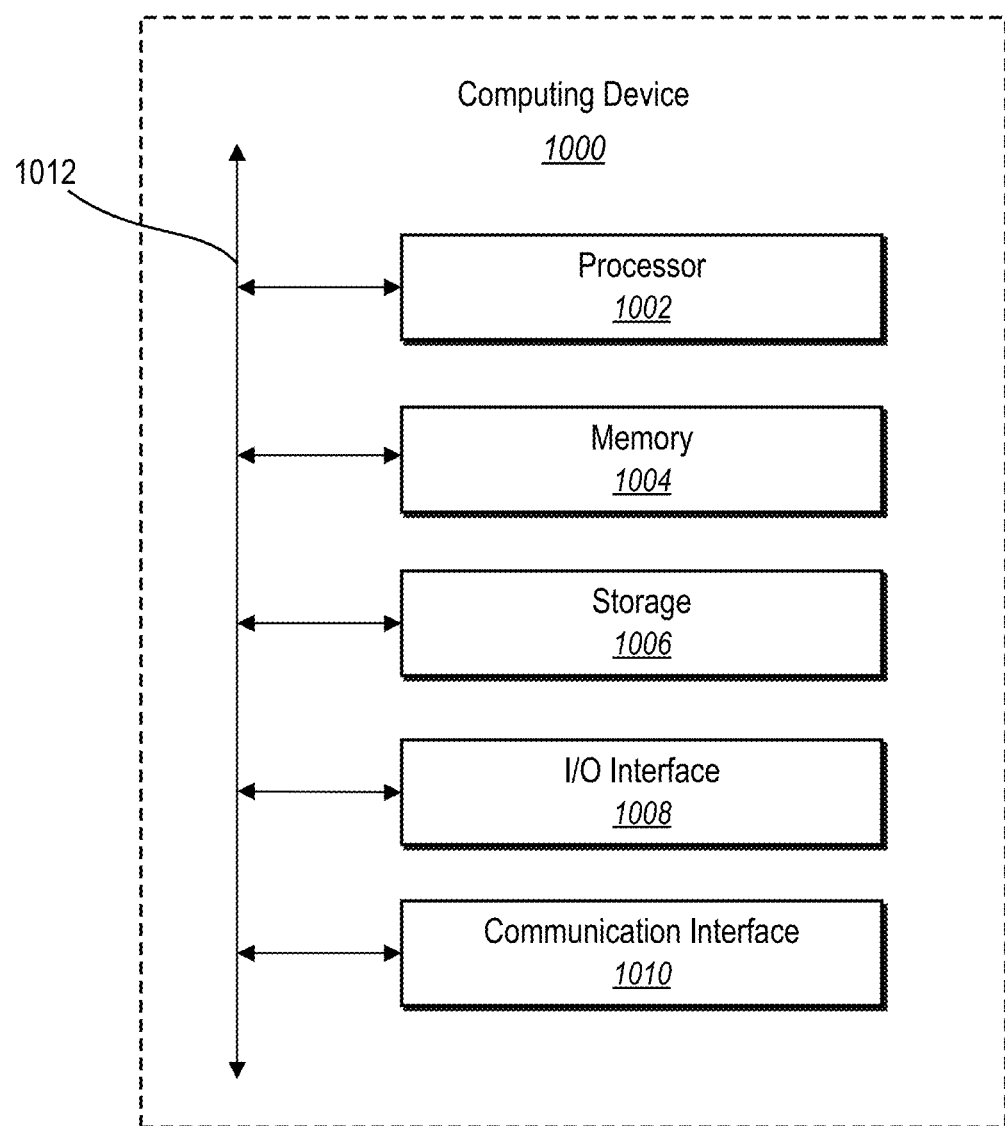
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the system(s) of FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
  determining, by at least one processor, a plurality of constraints comprising one or more minimum unit numbers or one or more maximum unit numbers associated with one or more of a plurality of physical emissions sources;
  determining a plurality of emissions values for the plurality of physical emissions sources by:
    determining, utilizing a neural network, a feature representation for an entity corresponding to the plurality of physical emissions sources according to attributes associated with the entity;
    determining, utilizing the neural network, one or more additional feature representations for one or more additional entities according to additional attributes associated with the one or more additional entities; and
    determining the plurality of emissions values for the entity based on the one or more additional entities in response to distances between the feature representation and the one or more additional feature representations being within a threshold distance within a feature space;

generating, by the at least one processor, an action recommendation for modifying the plurality of physical emissions sources by utilizing a modified gradient descent model to iteratively adjust the plurality of emissions values for the plurality of physical emissions sources by determining a first set of adjusted emissions values for the plurality of physical emissions sources according to the plurality of constraints and one or more target emissions values for the plurality of physical emissions sources and a second set of adjusted emissions values for the plurality of physical emissions sources without the plurality of constraints; and causing, by the at least one processor according to the action recommendation, a source modification device to modify an operating temperature, an operating speed, an operating power, or an operating time of at least one physical emissions source of the plurality of physical emissions sources.

2. The computer-implemented method as recited in claim 1, further comprising determining the plurality of emissions values by:

determining, from a database, per-unit emissions values of the plurality of physical emissions sources for a plurality of source categories; and determining, for a physical emissions source of the plurality of physical emissions sources, an emissions value based on per-unit emissions values for a source category of the physical emissions source and a number of units of the physical emissions source.

3. The computer-implemented method as recited in claim 1, wherein determining the plurality of constraints comprises:

determining, in response to a first parameter input via a first graphical user interface element corresponding to the plurality of physical emissions sources, a first constraint comprising the one or more minimum unit numbers or the one or more maximum unit numbers associated with the one or more of the plurality of physical emissions sources; and determining, in response to a second parameter input via a second graphical user interface element corresponding to the plurality of physical emissions sources, a second constraint corresponding to operations.

4. The computer-implemented method as recited in claim 1, wherein generating the action recommendation comprises determining the second set of adjusted emissions values for the plurality of physical emissions sources in response to determining the first set of adjusted emissions values.

5. The computer-implemented method as recited in claim 1, wherein generating the action recommendation comprises:

determining that the modified gradient descent model returns an error indicating that the one or more target emissions values are incompatible with the first set of adjusted emissions values with the plurality of constraints; and determining, in response to the error, the second set of adjusted emissions values for the plurality of emissions values without the plurality of constraints to achieve the one or more target emissions values.

6. The computer-implemented method as recited in claim 1, wherein generating the action recommendation comprises:

determining, utilizing the modified gradient descent model, a physical emissions source of the plurality of physical emissions sources that has a highest contribution proportion to the plurality of emissions values; and determining, utilizing the modified gradient descent model, a modified emissions value meeting the plurality of constraints for the physical emissions source having the highest contribution proportion.

7. The computer-implemented method as recited in claim 1, wherein generating the action recommendation comprises:

determining that the modified gradient descent model is unable to generate emissions values for the plurality of physical emissions sources that meet the plurality of constraints in connection with the second set of adjusted emissions values; and generating an additional action recommendation to modify one or more constraints of the plurality of constraints.

8. The computer-implemented method as recited in claim 1, wherein causing the source modification device to modify the operating temperature, the operating speed, the operating power, or the operating time of the at least one physical emissions source comprises setting an automatic time limit for operating the at least one physical emissions source.

9. The computer-implemented method as recited in claim 1, further comprising:

comparing entity data for the entity to additional entity data for the one or more additional entities; and generating a notification to provide to a computing device associated with the entity in response to detecting a deviation of the entity data for the entity relative to the additional entity data for the one or more additional entities.

10. A system comprising:

one or more memory devices; and one or more processors configured to cause the system to:

determine a plurality of constraints comprising one or more minimum unit numbers or one or more maximum unit numbers associated with one or more of a plurality of physical emissions sources;

determine a plurality of emissions values for the plurality of physical emissions sources by:

determining, utilizing a neural network, a feature representation for an entity corresponding to the plurality of physical emissions sources according to attributes associated with the entity;

determining, utilizing the neural network, one or more additional feature representations for one or more additional entities according to additional attributes associated with the one or more additional entities; and determining the plurality of emissions values for the entity based on the one or more additional entities in response to distances between the feature representation and the one or more additional feature representations being within a threshold distance within a feature space;

generate an action recommendation for modifying the plurality of physical emissions sources by utilizing a modified gradient descent model to iteratively adjust the plurality of emissions values for the plurality of physical emissions sources by determining a first set of adjusted emissions values for the plurality of physical emissions sources with according to the plurality of constraints and one or more target emissions values for the plurality of physical emissions sources and a second set of adjusted emissions values for the plurality of physical emissions sources without the plurality of constraints; and cause, according to the action recommendation, a source modification device to modify an operating temperature, an operating speed, an operating power, or an operating time of at least one physical emissions source of the plurality of physical emissions sources.

11. The system of claim 10, wherein the one or more processors are configured to cause the system to determine the plurality of constraints by:
generating, for display within a graphical user interface, a plurality of graphical user interface elements for the plurality of physical emissions sources corresponding to an entity; and
receiving, in response to interactions with the plurality of graphical user interface elements, the plurality of constraints comprising the one or more minimum unit numbers or the one or more maximum unit numbers associated with the one or more of the plurality of physical emissions sources.

12. The system of claim 10, wherein the one or more processors are configured to cause the system to cause the source modification device to modify the operating temperature, the operating speed, the operating power, or the operating time of the at least one physical emissions source by limiting operation of the at least one physical emissions source to a range of operating parameters corresponding to the operating temperature, the operating speed, or the operating power.

13. The system of claim 10, wherein the one or more processors are configured to cause the system to determine the one or more target emissions values by determining a target combined emissions value for the plurality of physical emissions sources corresponding to a plurality of emission types for the plurality of physical emissions sources.

14. The system of claim 10, wherein the one or more processors are configured to cause the system to cause the source modification device to generate the action recommendation by:
determining that modifying a number of units for one or more physical emissions sources of the plurality of physical emissions sources modifies the plurality of emissions values to meet the one or more target emissions values; and
generating the action recommendation to modify the number of units for the one or more physical emissions sources by a target time period.

15. The system of claim 10, wherein the one or more processors are configured to cause the system to:
determine, utilizing the modified gradient descent model, that the one or more target emissions values are not possible according to the plurality of constraints;
determine, utilizing the modified gradient descent model, modified constraints that achieve the one or more target emissions values; and
generate an additional action recommendation to modify the plurality of constraints according to the modified constraints.

16. The system of claim 10, wherein the one or more processors are configured to cause the system to generate the action recommendation by:
determining that the modified gradient descent model returns an error for the first set of adjusted emissions values with the plurality of constraints indicating that the one or more target emissions values are not possible for the first set of adjusted emissions values; and
determining, utilizing the modified gradient descent model in response to the error, the second set of adjusted emissions values for the plurality of emissions values without the plurality of constraints to achieve the one or more target emissions values.

17. A computer-implemented method comprising:
instructing a computing system to generate an action recommendation for modifying a plurality of physical emissions sources, wherein the computing system generates the action recommendation by:
determining a plurality of constraints comprising one or more minimum unit numbers or one or more maximum unit numbers associated with one or more of the plurality of physical emissions sources;
determining a plurality of emissions values for the plurality of physical emissions sources by:
determining, utilizing a neural network, a feature representation for an entity corresponding to the plurality of physical emissions sources according to attributes associated with the entity;
determining, utilizing the neural network, one or more additional feature representations for one or more additional entities according to additional attributes associated with the one or more additional entities; and
determining the plurality of emissions values for the entity based on the one or more additional entities in response to distances between the feature representation and the one or more additional feature representations being within a threshold distance within a feature space;
generating the action recommendation by utilizing a modified gradient descent model to iteratively adjust the plurality of emissions values for the plurality of physical emissions sources by determining a first set of adjusted emissions values for the plurality of physical emissions sources according to the plurality of constraints and one or more target emissions values for the plurality of physical emissions sources and a second set of adjusted emissions values for the plurality of physical emissions sources without the plurality of constraints; and
modifying, according to the action recommendation, an operating temperature, an operating speed, an operating power, or an operating time of at least one physical emissions source of the plurality of physical emissions sources.

18. The computer-implemented method of claim 17, further comprise receiving the action recommendation from the computing system in response to the computing system generating the action recommendation.

19. The computer-implemented method of claim 17, wherein modifying the operating temperature, the operating speed, the operating power, or the operating time of the at least one physical emissions source comprises utilizing a source modification device associated with the at least one physical emissions source to limit operation of the at least one physical emissions source to operating during a certain time of day.

20. The computer-implemented method of claim 17, further comprising:
receiving an additional action recommendation to modify one or more constraints of the plurality of constraints in response to the computing system determining that a modified gradient descent model is unable to generate emissions values for the plurality of physical emissions sources that meet the plurality of constraints; and providing a modified constraint to the computing system in response to the additional action recommendation.

\* \* \* \* \*